United States Patent
Singh

(10) Patent No.: US 10,979,908 B2
(45) Date of Patent: Apr. 13, 2021

(54) MONITORING AND SWITCHOVER OF SHARED SPECTRUM ALLOCATION MANAGER TO PROVIDE IMPROVED WIRELESS SERVICE

(71) Applicant: CHARTER COMMUNICATIONS OPERATING, LLC, Saint Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/112,567

(22) Filed: Aug. 24, 2018

(65) Prior Publication Data

US 2020/0059794 A1    Feb. 20, 2020

Related U.S. Application Data

(63) Continuation-in-part of application No. 15/999,262, filed on Aug. 17, 2018.

(51) Int. Cl.
*H04W 16/14* (2009.01)
*H04W 72/04* (2009.01)

(52) U.S. Cl.
CPC ........... *H04W 16/14* (2013.01); *H04W 72/04* (2013.01)

(58) Field of Classification Search
CPC ..... H04W 16/14; H04W 72/04; H04W 24/02; H04W 24/04; H04W 72/00; H04W 60/00; H04L 41/0681; H04L 41/0686
See application file for complete search history.

(56) References Cited

U.S. PATENT DOCUMENTS 9,060,309 B2 * 6/2015 Lim ..................... H04W 28/18
9,232,501 B2 * 1/2016 Rohit ................... H04W 74/08
10,271,351 B1    4/2019 Wang
(Continued)

OTHER PUBLICATIONS

Palola et al. "Field Trial of the 3.5 GHz Citizens Broadband Radio Service Governed by a Spectrum Access System (SAS)", 2017, IEEE, 2017 IEEE International Symposium on Dynamic Spectrum Access Networks (DySPAN), Total Pages: 9 (Year: 2017).*

*Primary Examiner* — Un C Cho
*Assistant Examiner* — Shah M Rahman
(74) *Attorney, Agent, or Firm* — Armis IP Law, LLC

(57) ABSTRACT

According to one configuration, a system includes provisioning hardware and a wireless station that supports communications with one or more communication devices. The wireless station receives a first notification from the provisioning system. The first notification indicating that the wireless station is assigned to a first allocation management resource. The first allocation management resource operable to allocate wireless resources for use by the wireless station to support wireless communications. The wireless station communicates with the first allocation management resource to receive allocation information indicating the wireless resources allocated for use by the wireless station. In response to receiving a second notification that the wireless station has been reassigned to a second allocation management resource, the wireless station communicates with the second allocation management resource instead of the first allocation management resource to receive the allocation information.

33 Claims, 15 Drawing Sheets

(56) References Cited

U.S. PATENT DOCUMENTS

| | | | |
|---|---|---|---|
| 2012/0314689 A1* | 12/2012 | Wang | H04W 36/12 370/331 |
| 2013/0178211 A1* | 7/2013 | Wang | H04W 24/02 455/436 |
| 2016/0174095 A1* | 6/2016 | Damnjanovic | H04W 36/24 370/252 |
| 2016/0198360 A1 | 7/2016 | Smith | |
| 2016/0262024 A1* | 9/2016 | Freda | H04W 72/0453 |
| 2016/0330743 A1* | 11/2016 | Das | H04L 5/0048 |
| 2017/0041106 A1* | 2/2017 | Srivastava | H04L 5/0007 |
| 2017/0156142 A1* | 6/2017 | Sato | H04W 88/08 |
| 2017/0208454 A1 | 7/2017 | Knisely | |
| 2017/0359851 A1* | 12/2017 | Kakinada | H04W 76/36 |
| 2018/0048383 A1* | 2/2018 | Syed | H04B 7/212 |
| 2018/0115903 A1 | 4/2018 | Badic | |
| 2018/0124792 A1 | 5/2018 | Khoshnevisan | |
| 2018/0132112 A1* | 5/2018 | Khoshnevisan | H04W 16/14 |
| 2018/0132240 A1* | 5/2018 | Yang | H04W 76/28 |
| 2019/0028930 A1* | 1/2019 | Zhang | H04W 28/16 |
| 2019/0058999 A1 | 4/2019 | Gunasekara | |
| 2019/0124664 A1* | 4/2019 | Wang | H04W 36/22 |
| 2019/0124665 A1 | 4/2019 | Singh | |
| 2019/0141713 A1* | 5/2019 | Cimpu | H04W 72/10 |
| 2019/0215058 A1* | 7/2019 | Smyth | H04B 7/18517 |
| 2019/0223037 A1 | 7/2019 | Raghothaman | |
| 2019/0335337 A1 | 10/2019 | Damnjanovic | |
| 2019/0364565 A1 | 11/2019 | Hmimy | |
| 2019/0373615 A1 | 12/2019 | Cimpu | |
| 2019/0393926 A1* | 12/2019 | Kakinada | H04B 1/7136 |
| 2020/0008070 A1 | 1/2020 | Furuichi | |
| 2020/0008138 A1 | 1/2020 | Sasindran | |

\* cited by examiner

MONITORING AND SWITCHOVER OF SHARED SPECTRUM ALLOCATION MANAGER TO PROVIDE IMPROVED WIRELESS SERVICE

RELATED APPLICATIONS

This application is a continuation in part of earlier filed U.S. patent application Ser. No. 15/999,262 entitled "MONITORING AND SWITCHOVER OF SHARED SPECTRUM ALLOCATION MANAGER IN A WIRELESS NETWORK," filed on Aug. 17, 2018, the entire teachings of which are incorporated herein by this reference.

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access Service) to support communications with one or more mobile communication devices. For example, a base station can be configured to communicate with the SAS to receive notification of the wireless channel allocated for use.

BRIEF DESCRIPTION OF EMBODIMENTS

There are deficiencies associated with conventional techniques of a base station such as a CBSD receiving frequency/spectrum allocation information from a single allocation management resource such as a SAS (Spectrum Access Server). For example, if the single SAS assigned to the base station fails and is unable to grant the wireless channel, the base station is unable to continue using allocated wireless bandwidth in a CBRS band to support wireless communications with one or more mobile communication devices. Thus, a single point failure of the SAS prevents the wireless station from providing wireless service to the one or more communication devices.

Embodiments herein provide novel ways of providing improved wireless communications to one or more mobile communication devices in a network environment.

First Embodiments

More specifically, in one embodiment, a communication system includes provisioning hardware, monitor hardware, a wireless station, a first allocation management resource, and a second allocation management resource.

The provisioning hardware assigns the first allocation management resource to the wireless station. During operation, the first allocation management resource allocates wireless resources such as one or more wireless channels for use by the wireless station to support wireless communications in a wireless network environment. The monitor hardware monitors an operational status of each of the multiple allocation management resources. In response to the monitor resource detecting that the first wireless management resource becomes offline (such as due to a failure or other condition), the provisioning hardware reassigns the wireless station to the second allocation management resource.

In one embodiment, the monitor resource monitors: i) operability of the first allocation management resource, ii) operability of the second allocation management resource, and so on. Monitoring operability of each allocation management resource can include repeatedly communicating with each of the allocation management resources to determine that they are operating properly. If an allocation management resource does not properly respond to inquiries or provide keep alive notices to the monitor resource, then the monitor resource deems the allocation management resource to be off-line.

In accordance with further embodiments, the provisioning hardware receives a notification from the monitor resource regarding the health status of each allocation management resource and potentially which new allocation management resource is to be assigned to a wireless station. When the monitor resource detects failure of the first allocation management resource, the monitor resource notifies the provisioning hardware of the corresponding offline condition such as a failure. Assuming that the wireless station is initially assigned to receive channel allocation information from the first allocation management resource, in response to receiving notification of the failure condition of the first allocation resource, the provisioning hardware sends a message to the wireless station. The message from the provisioning hardware indicates the new assignment of the second allocation management resource to the wireless station. After such assignment, the wireless station communicates with the second allocation management resource (detected as being healthy and online) to receive channel allocation information.

In accordance with further embodiments, the provisioning hardware is further operable to communicate one or more messages including access information to the wireless station. In one embodiment, the access information indicates an address (such as a Uniform Resource Locator, network address information, etc.) indicating how to communicate with the second allocation management resource and receive channel allocation information.

In accordance with still further embodiments, the allocation management resources communicate amongst each other to negotiate availability and allocation of wireless bandwidth to each of multiple wireless stations to prevent interference amongst multiple wireless station or communication devices using the allocated wireless bandwidth.

In accordance with yet further embodiments, each of the allocation management resources allocates bandwidth from a shared, unlicensed wireless spectrum. For example, in one embodiment, the allocation information indicates information such as wireless bandwidth, wireless channel, etc., of a CBRS (Citizen Band Radio Service) band allocated for use by the wireless station.

As previously discussed, the communication system as described herein can include provisioning hardware. In one embodiment, the provisioning hardware receives a command from the monitor resource. The received command notifies the wireless station to switch over to communicating with the second allocation management resource for receipt of the wireless resources. The command causes the wireless station to discontinue use of the first allocation management resource and register with the second allocation management resource to receive the wireless resources to support the wireless communications.

Second Embodiments

Further embodiments herein include a system including provisioning hardware and a wireless station. The wireless station is operable to receive a first notification from the provisioning system. The received first notification indicates that the wireless station is assigned to a first allocation management resource from which to receive channel allocation information for use by the wireless station to support wireless communications. Using the assigned one or more wireless channels as specified by the channel allocation information, the wireless station provides wireless service to one or more communication devices.

To receive the channel allocation information indicating the wireless resources allocated for use by the wireless station, the wireless station communicates with the first allocation management resource. In response to receiving a second notification that the wireless station has been reassigned to a second allocation management resource, the wireless station communicates with the second allocation management resource instead of the first allocation management resource to receive the allocation information. In one example embodiment, the second notification is generated in response to detecting an inability of the first allocation management resource to provide the allocation information to the wireless station or inability of the first allocation management resource to provide permission to the wireless station to use one or more previously allocated channels.

In response to being reassigned to the second allocation management resource instead of the first allocation management resource, the wireless station registers itself (such as via a registration update) with the second allocation management resource to receive updated allocation information. In one embodiment, the second allocation management resource receiving the registration update from the wireless station communicates with the first allocation management resource to complete the handoff. The first allocation management resource notifies the second allocation management resource of wireless resources currently allocated to the wireless station. The second allocation management resource then sends a registration response to the wireless station. The wireless station receives the registration response from the second allocation management resource indicating that the second allocation management resource acknowledges that it is to provide the wireless station with channel allocation information. Thus, in one embodiment, the registration response indicates registration of the wireless station with the second allocation management resource to receive the allocation information.

The allocation information communicated to the wireless station can be any suitable information. For example, in one embodiment, the allocation information indicates wireless bandwidth such as one or more wireless channels of a CBRS (Citizen Band Radio Service) band allocated for use by the wireless station.

In accordance with yet further embodiments, the allocation management resources can be configured to communicate with each other via to negotiate use of an available spectrum amongst different wireless stations. In one embodiment, as previously discussed, the second allocation management resource is operable to communicate acknowledgement of a switchover to the first allocation management resource in response to receiving the request (such as a registration update request) from the wireless station.

In accordance with still further embodiments, the allocated wireless channel used by the wireless station provides continued wireless connectivity between the wireless station and the mobile communication device during switchover of receiving the allocation information from the first allocation management resource to receiving the allocation information from the second allocation management resource.

Embodiments herein are useful over conventional techniques. For example, switchover of a wireless station from a first allocation management resource to a second allocation management resource in the event of a failure or other condition reduces or eliminates an amount of time that a wireless station is non-operational due to the inability to receive channel allocation information or provide permission to use one or more granted channels. Thus, embodiments herein support moving a CBSD network to a new SAS without causing a network outage, providing better wireless connectivity service to communication devices in a respective network. In such an instance, the wireless system as described herein can be used to provide connectivity for critical applications that require continuous connectivity to a respective network.

Further embodiments herein include registering a wireless station with a first allocation management resource that provides allocation information to the wireless station. The allocation information specifies wireless resources for use by the wireless station to support wireless communications. In response to detecting a trigger condition, the wireless station is registered with a second allocation management resource as a replacement to the first allocation management resource. The communication system provides continued use of the wireless resources as specified by the allocation information during and after switchover of registration of the wireless station with the second allocation management resource.

In accordance with further embodiments, a registration management resource or other suitable resource communicates the allocation information from the wireless station to the second allocation management resource.

In accordance with still further embodiments, the wireless station receives confirmation from the second allocation management resource or other suitable resource that the allocation information is valid for use by the wireless station.

Further embodiments herein include the first allocation management resource communicating the allocation information to a registration management resource prior to detecting the trigger condition. The registration management resource verifies use of (or further use of) the wireless resources as specified by the allocation information to the second allocation management resource. In such an instance, the wireless station is able to continue to use the wireless resources allocated by the first allocation management resource even though the wireless station is assigned to a new allocation management resource (second allocation management resource).

In accordance with further embodiments, in a similar manner as previously discussed, the trigger condition is a failure of the first allocation management resource.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: assign a first allocation management resource to a wireless station, the first allocation management resource being one of multiple available allocation management resources, the first allocation management resource operable to allocate wireless resources for use by the wireless station to wirelessly communicate with mobile communication devices; monitor an operational status of each of the multiple wireless management resources; and in response to detecting that the first wireless management resource becomes offline, assign the wireless station to a second wireless management resource of the multiple available wireless management resources.

Another embodiment includes a computer readable storage medium and/or system having instructions stored thereon to facilitate continued wireless service to communication devices in a network environment. The instructions, when executed by computer processor hardware, cause the computer processor hardware (such as one or more co-located or disparately processor devices) to: receive a first notification indicating that a wireless station is assigned to a first allocation management resource, the first allocation management resource operable to allocate wireless resources for use by the wireless station to support wireless communications; communicate with the first allocation management resource to receive allocation information indicating the wireless resources allocated for use by the wireless station; and in response to receiving a second notification that the wireless station has been reassigned to a second allocation management resource, communicating with the second allocation management resource instead of the first allocation management resource to receive the allocation information.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
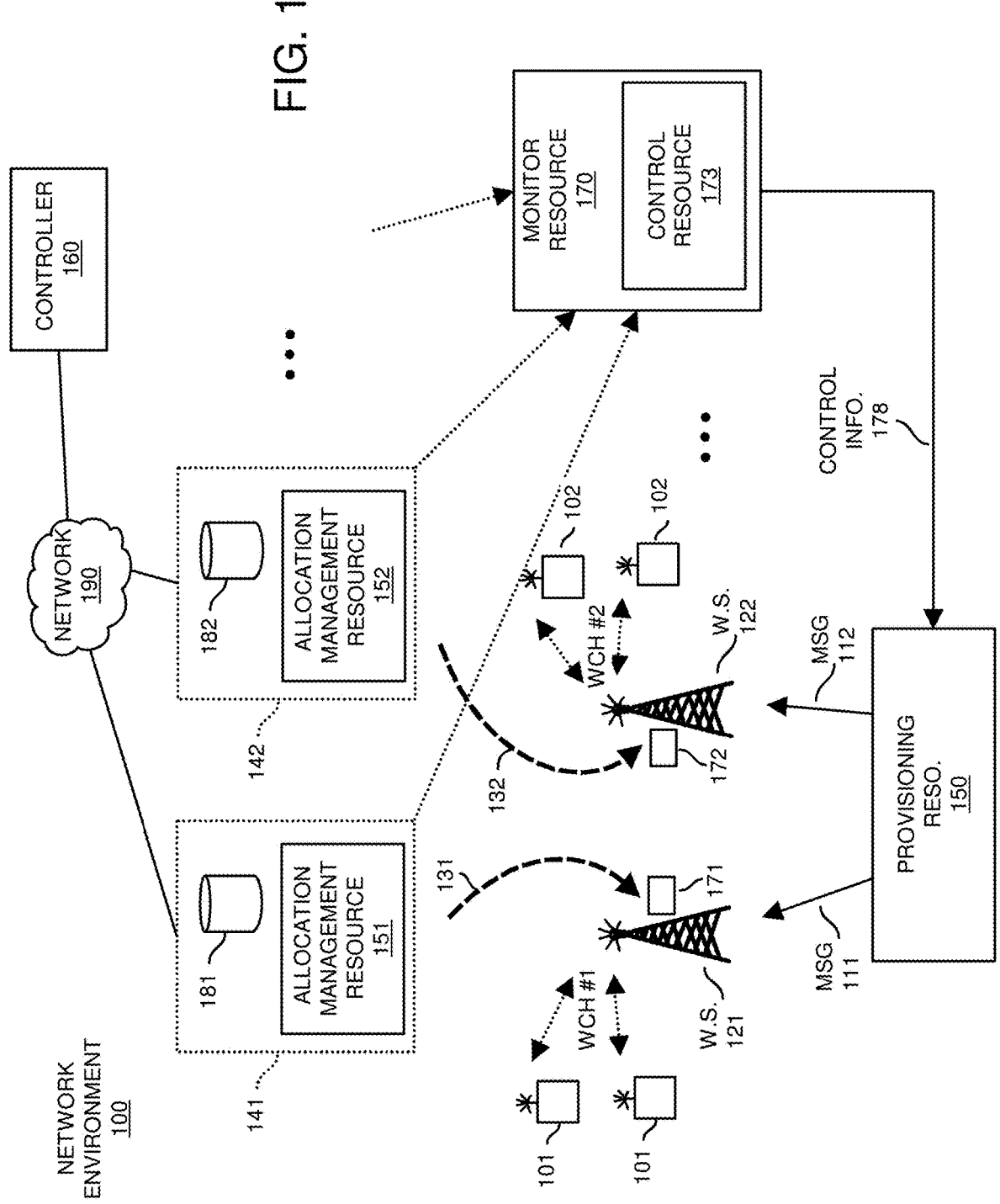
FIG. 1 is an example diagram illustrating a wireless network environment and distribution of channel allocation information to provide wireless connectivity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a wireless communication system includes provisioning hardware, monitor hardware, one or more wireless stations, and multiple allocation management resources such as a first allocation management resource, a second allocation management resource, etc.

During operation, the provisioning hardware assigns the first allocation management resource for use by the wireless station. Initially, the first allocation management resource allocates wireless resources to support wireless communications in a wireless network environment. The monitor hardware monitors an operational status of each of the multiple allocation management resources. In response to the monitor resource detecting that the first wireless management resource becomes offline or unavailable (such as due to a failure), or detecting a business decision to software to use a different allocation management resource, the management hardware reassigns the wireless station to the second allocation management resource.

Now, more specifically, FIG. 1 is an example diagram illustrating a wireless network environment and distribution of channel allocation information to provide wireless connectivity services according to embodiments herein.

As shown, the communication system in network environment 100 includes monitor resource 170, provisioning resource 150, wireless station 121, wireless station 122, allocation system 141, allocation system 142, network 190, and controller 150.

Communication management resource 171 is configured to manage operations associated with wireless station 121. Communication management resource 172 is configured to manage operations associated with wireless station 122. Each of communication management resource 171 and communication management resource 172 reside at any suitable location in the network environment 100.

In one non-limiting example embodiment, the communication management resource 171 resides at or is co-located at the wireless station 121; the communication management resource 172 resides at or is co-located at the wireless station 122.

Monitor resource 170 includes control resource 173. Allocation system 141 includes allocation management resource 151 and corresponding repository 181 to store information. In a similar manner, allocation system 142 includes allocation management resource 152 and repository 182 to store information.

Note that each of the resources in network environment can be configured to include appropriate hardware, software, or combination of hardware and software to carry out respective operations as discussed herein.

More specifically, the monitor resource 170 can be implemented via monitor hardware and/or monitor software; control resource 173 can be implemented via control hardware and/or control software; provisioning resource 150 can be implemented via provision hardware and/or provisioning software; allocation management resource 151 can be implemented via corresponding allocation management hardware and/or allocation management software; allocation management resource 152 can be implemented via allocation management hardware and/or allocation management software, and so on.

In accordance with yet further embodiments, each of the allocation management resources allocates bandwidth from a shared, unlicensed wireless spectrum for use by a wireless station (such as an eNodeB). For example, in one embodiment, the channel allocation information 131, 132, etc., communicated to the wireless stations can indicate information such as wireless bandwidth, wireless channel, etc., of a CBRS (Citizen Band Radio Service) band allocated for use by the respective wireless station.

The allocation management resources 151, 152, etc., communicate amongst each other regarding allocation of different wireless channels to the wireless stations in network environment 100. A portion of the available spectrum (such as an unlicensed portion of the available spectrum) may be available when it is not used by a respective incumbent user that has a higher priority.

In one embodiment controller 160 determines when the channels in the spectrum are available and unavailable to the wireless stations for use.

As further shown, the controller 160 is in communication with the allocation management resources 151, 152, etc., to notify them when corresponding wireless channels of the spectrum are available. When channels are available, such as because they are not used by an incumbent user, the allocation management resources negotiate amongst themselves to determine how to allocate the available wireless channels to the wireless stations in the network environment 100. In one embodiment, the allocation management resources communicate amongst each other to negotiate availability and allocation of wireless bandwidth to multiple wireless stations to prevent interference amongst multiple wireless stations or communication devices using the allocated wireless bandwidth.

Prior to each of the wireless stations being able to transmit in the network environment 100, the wireless stations must be allocated one or more wireless channels for use by a respective allocation management resource. In one embodiment, each of the allocation management resources represent so-called SASs (Spectrum Allocation Systems). Such systems can be operated by the same or different service providers. In one embodiment, a wireless network service provider (potentially different than the one or more service providers that provide the allocation management services) provides and operates wireless station 121, monitor resource 170, and provisioning resource 150, etc.

In accordance with further example embodiments, as its name suggests, the provisioning resource 150 provisions which of the allocation management resources is assigned to a respective wireless station.

For example, in this example embodiment, the provisioning resource 150 is operable to communicate message 111 (such as access information) to the wireless station 121 to notify the wireless station 121 of its assignment to the allocation management resource 151. In one embodiment, the message 111 indicates an address (such as a Uniform Resource Locator, network address information, or other information) in which to communicate with an assigned allocation management resource and receive channel allocation information.

Additionally, the provisioning resource 150 is operable to communicate message 112 (such as access information) to the wireless station 122 to notify the wireless station 122 of its assignment to the allocation management resource 152. In one embodiment, the message 112 indicates an address (such as a Uniform Resource Locator, network address information, or other information) in which to communicate with an assigned allocation management resource and receive channel allocation information.

Further in this example embodiment, to support wireless communications with mobile communication devices 101, the communication management resource 171 of wireless station 121 uses the access information (such as received in message 111) to communicate with the allocation management resource 151. For example, the communication management resource 171 communicates with the allocation management resource 151 using network address information (such as a URL) as indicated by the message 111.

The communication management resource 171 registers the wireless station 121 with the allocation management resource 151. Allocation management resource 151 stores registration information and other data in repository 181. In response to registering with the allocation management resource 151, the allocation management resource 151 communicates channel access information 131 to the wireless station 121.

To support wireless communications with mobile communication devices 102, the communication management resource 172 of the wireless station 122 uses the access information (such as received in message 112) to communicate with the allocation management resource 152. For example, the communication management resource 172 communicates with the allocation management resource 152 using network address information (such as a URL) as indicated by the message 111. The communication management resource 172 registers the wireless station 122 with the allocation management resource 152. Allocation management resource 152 stores registration information and other data in repository 182. In response to registering with the allocation management resource 152, the allocation management resource 152 communicates channel access information 132 to the wireless station 122.

Figure 2:
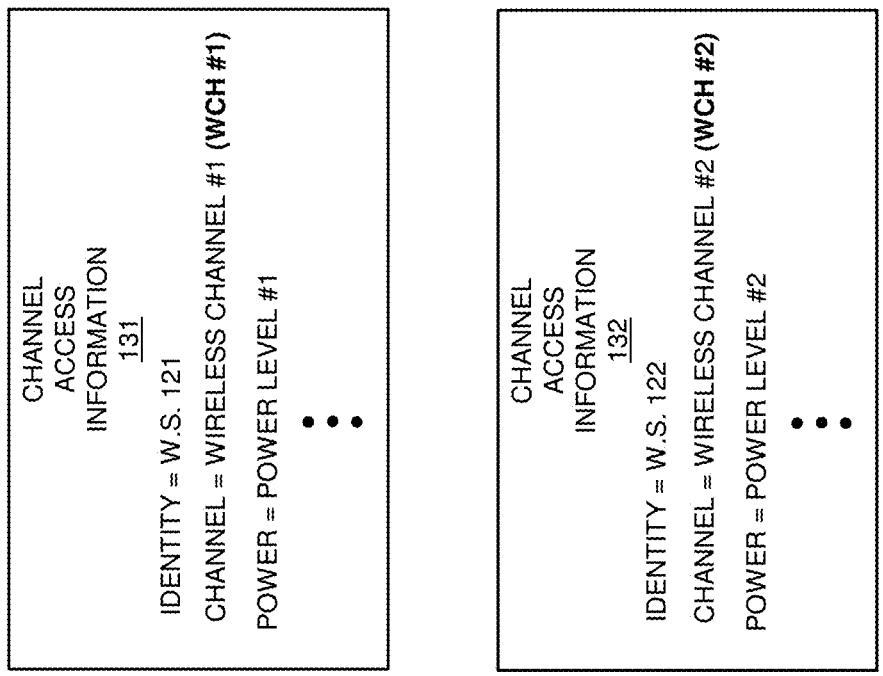
FIG. 2 is an example diagram of channel allocation information according to embodiments herein.

FIG. 2 is an example diagram of channel allocation information according to embodiments herein.

In this example embodiment, the allocation management resource 151 generates the channel access information 131 to indicate any suitable parameters that are to be used by the wireless station 121 to support wireless communications in the network environment 100. In one embodiment, the parameters include channel information indicating a respective one or more wireless channels that are being allocated for use by the wireless station 121. More specifically, in this example embodiment, channel access information 131 indicates that the wireless channel #1 is allocated for use by the wireless station 121 to provide wireless connectivity to resources such as the mobile communication devices 101.

The wireless channel assigned for use by the wireless station 121 can be specified in any suitable manner. For example, the channel access information 131 can be configured to indicate a name assigned to the sign channel, index value assigned to the wireless channel, a carrier frequency of the assigned channel, a bandwidth of the assigned channel, etc.

Additionally, in accordance with further embodiments as shown, the channel access information 131 can be configured to indicate information such as a power level at which the wireless station 121 is able to transmit communications in the network environment 100.

In a similar manner, the allocation management resource 152 generates the channel access information 132 to indicate any suitable parameters that are to be used by the wireless station 122 to support wireless communications in the network environment 100. In one embodiment, the parameters include channel information indicating a respective one or more wireless channels that are being allocated for use by the wireless station 122. More specifically, in this example embodiment, channel access information 131 indicates that the wireless channel #2 is allocated for use by the wireless station 122 to provide wireless connectivity to resources such as mobile communication devices 102.

The wireless channel assigned for use by the wireless station 122 can be specified in any suitable manner. For example, the channel access information 132 can be configured to indicate a name assigned to the sign channel, a carrier frequency of the assigned channel, a bandwidth of the assigned channel, etc.

Additionally, in accordance with further embodiments as shown, the channel access information 132 can be configured to indicate a power level at which the wireless station 122 is able to transmit communications in the network environment 100.

Referring again to FIG. 1, as previously discussed, via the message 111 from the provisioning resource 150 to the communication management resource 171 of wireless station 121, the provisioning resource 150 assigns the first allocation management resource 151 to the wireless station 121; via the message 112 from the provisioning resource 150 to the communication management resource 172 of wireless station 122, the provisioning resource 150 assigns the first allocation management resource 152 to the wireless station 122; and so on.

In a manner as specified by the received channel access information 131, the communication management resource 171 of the wireless station 121 provides wireless connectivity to the mobile communication devices 101 via use of the wireless channel #1.

In a manner specified by the received channel access information 132, the communication management resource 172 of the wireless station 122 provides wireless connectivity to the mobile communication devices 102 via the use of the wireless channel #2.

Accordingly, during operation, the first allocation management resource 151 allocates wireless resources for use by the wireless station 121 to support wireless communications in the network environment 100. The second allocation management resource 152 allocates wireless resources for use by the wireless station 122 to support wireless communications in the network environment 100.

Note that if a respective allocation management resource becomes disabled, fails, etc., in which such a resource is unable to distribute channel access information or confirm/grant permission of continued use of prior allocated channels as indicated by transmitted channel allocation information, then the respective wireless station can no longer transmit in the network environment 100 until that wireless station is assigned to a new (replacement) allocation management resource. This is because use of the wireless channel #1 in this example embodiment is contingent upon notification to the communication management resource 171 of the wireless station 121 that the prior transmitted channel allocation information is still valid for use.

Assume that there is no incumbent entity that results in deallocation of using wireless channel #1 and channel #2. In other words, assume again that the wireless station 121 is assigned use of wireless channel #1 and wireless station 122 is assigned use of wireless channel #2. In such an instance, during general operation, via a respective allocated wireless channel such as channel #1, the wireless station 121 provides mobile communication devices 101 wireless access to network 190. In a similar manner, a respective allocated wireless channel such as channel #2, wireless station 122 provides mobile communication devices 102 access to network 190.

As previously discussed, note again that the wireless channels such as channel #1 and channel #2 can be allocated from any suitable available wireless spectrum. In one embodiment, the wireless channel #1 and the wireless channel #2 are allocated from one or more channels available in a CBRS communication system.

As further discussed herein, the network environment 100 includes monitor resource 170. The monitor resource monitors the availability of the allocation management resources 151, 152, etc., in the event of detecting that one or more of the allocation management resources becomes off-line, the monitor resource 170 notifies the provisioning resource 150 which of the one or more wireless stations needs to be provisioned a different, active, allocation management resource.

Figure 3:
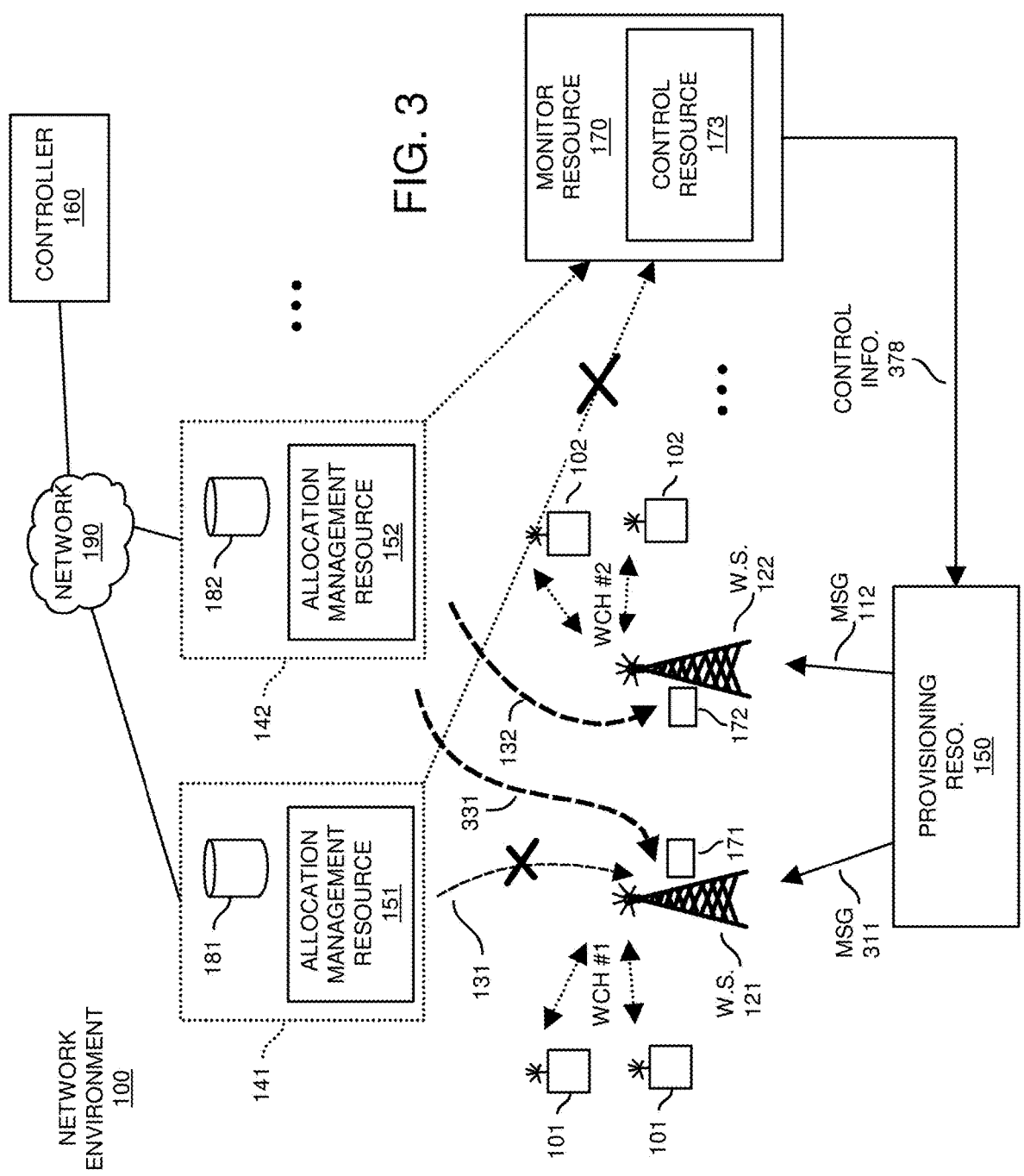
FIG. 3 is an example diagram illustrating a wireless network environment and reassignment of an allocation management resource to a wireless station according to embodiments herein.

FIG. 3 is an example diagram illustrating a wireless network environment and reassignment of an allocation management resource to a wireless station according to embodiments herein.

As previously discussed, the network environment 100 further includes monitor resource 170. As its name suggests, the monitor hardware 170 monitors an operational status of each of the multiple allocation management resources 151, 152, etc.

In a specific embodiment, the monitor resource 170 monitors: i) operability of the first allocation management resource, ii) operability of the second allocation management resource, and so on. Monitoring operability of each allocation management resource can include repeatedly, occasionally, intermittently, continuously, periodically, etc., communicating with each of the allocation management resources to determine whether they are operating properly.

In accordance with further embodiments, the provisioning resource 150 receives a notification from the monitor resource 150 regarding the health status of each of the monitored allocation management resources. When the monitor resource 170 detects failure of the first allocation management resource, or other condition such as that the allocation management resource 151 is now unavailable to service the wireless station 121, the monitor resource 170 notifies the provisioning resource 150 of the corresponding condition.

Embodiments herein switching assignment of a respective allocation management resource to a wireless station if an allocation management resource becomes offline (such as fails). For example, in one embodiment, in response to the monitor resource 170 detecting that the wireless management resource 151 becomes offline (such as due to a failure), the control resource 173 notifies, via control information 378, the provisioning resource 150 that allocation management resource 151 is not available. Assume that the control information 378 (such as a command) further indicates to reassign the wireless station 121 to the second allocation management resource 152 because allocation management resource 151 is no longer available for use by the wireless station 121.

In accordance with the control information 378 indicating to notify the wireless station 121 to switch over to communicating with the second allocation management resource 152 for receipt of channel allocation information instead of allocation management resource 151, the provisioning resource 150 communicates message 311 (such as a command and network address information of the allocation management resource 152) to wireless station 121. In one embodiment, the command causes the wireless station 121 to communicate and register with the allocation management resource 152 to receive channel allocation information 331 and/or grant messages indicating permission that the wireless station 121 is able to continue using a previously assigned wireless channel.

Figure 4:
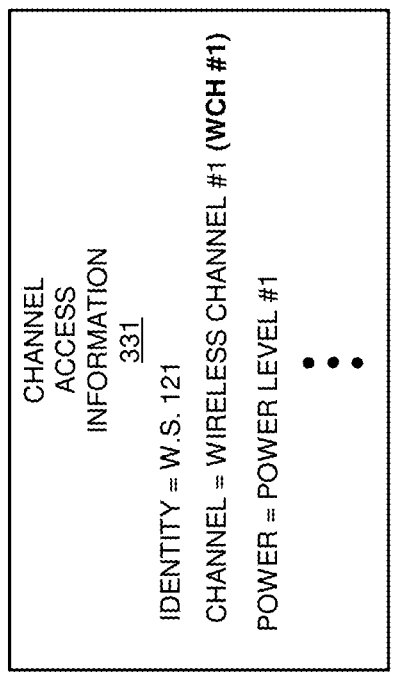
FIG. 4 is an example diagram of channel allocation information according to embodiments herein.

FIG. 4 is an example diagram of channel allocation information according to embodiments herein.

In this example embodiment, the allocation management resource 152 generates the channel access information 331 to indicate any suitable parameters that are to be used by the wireless station 121 to support wireless communications in the network environment 100. In one embodiment, the parameters include channel information indicating a respective wireless channel that is being allocated for use by the wireless station 121. More specifically, channel access information 331 indicates that the wireless channel #1 is still allocated for use by the wireless station 121 to provide wireless connectivity to the mobile communication devices 101.

The one or more wireless channels assigned for use by the wireless station 121 can be specified in any suitable manner. For example, the channel access information 331 can be configured to indicate a name assigned to the assigned channel, a carrier frequency of the assigned channel, a bandwidth of the assigned channel, etc.

Additionally, in accordance with further embodiments as shown, the channel access information 331 can be configured to indicate additional parameters such as a power level at which the wireless station 121 is able to transmit communications in the network environment 100 via the assigned wireless channel #1.

Referring again to FIG. 3, as shown, the wireless station 121 continues using the wireless channel #1 to support wireless communications with communication devices 101 based on the channel allocation information 331 received from the newly assigned allocation management resource 152. Note that as an alternative to receiving the new channel allocation information 331, the communication management resource 171 of the wireless station 121 can receive confirmation/grant permission messages from the allocation management resource 150 indicating that the wireless station 121 is able to continue using the previously assigned wireless channel #1.

Note that the monitor resource 170 can be configured to monitor any suitable resource to determine if a respective allocation management resource is offline (no longer available. For example, as previously discussed, the monitor resource 170 can be configured to communicate with each of the allocation management resources. Additionally, or alternatively, the monitor resource 170 can be configured to receive feedback from the wireless stations 121 and 122 regarding whether or not the allocation management resources are online or off-line. In one embodiment, the feedback received from the wireless station 121 or other resource such as communication management resource 171 indicates whether or not the wireless station 121 is able to communicate with its assigned allocation management resource. If the wireless station 121 is unable to communicate with the originally assigned allocation management resource 151 as indicated by received channel access information 131, then the monitor resource 170 can be configured to notify the provisioning resource 150 of a respective newly assigned allocation management resource 152 to the wireless station 122.

Figure 5:
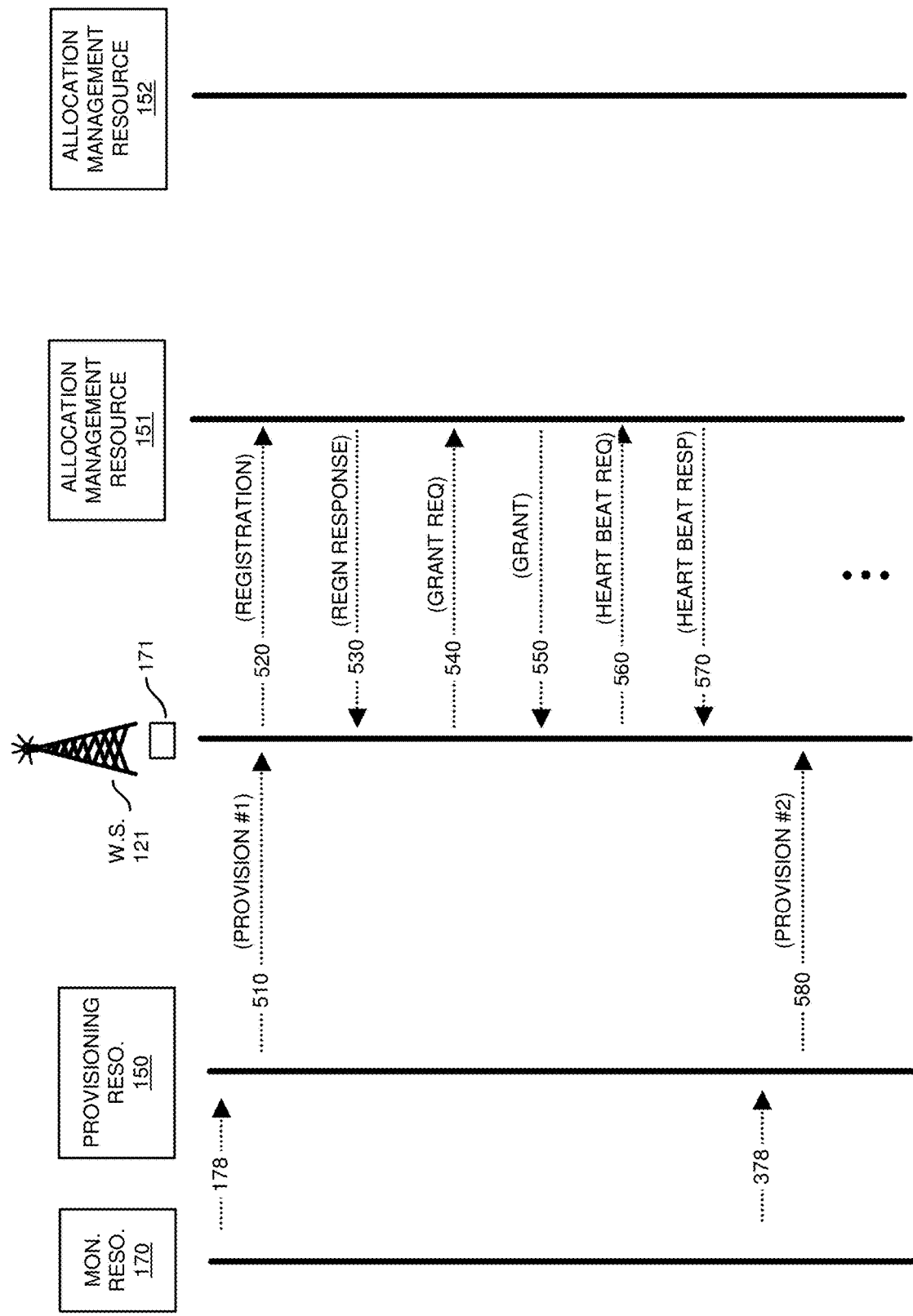
FIGS. 5 and 6 are example timing diagrams illustrating communications according to embodiments herein.
Figure 6:
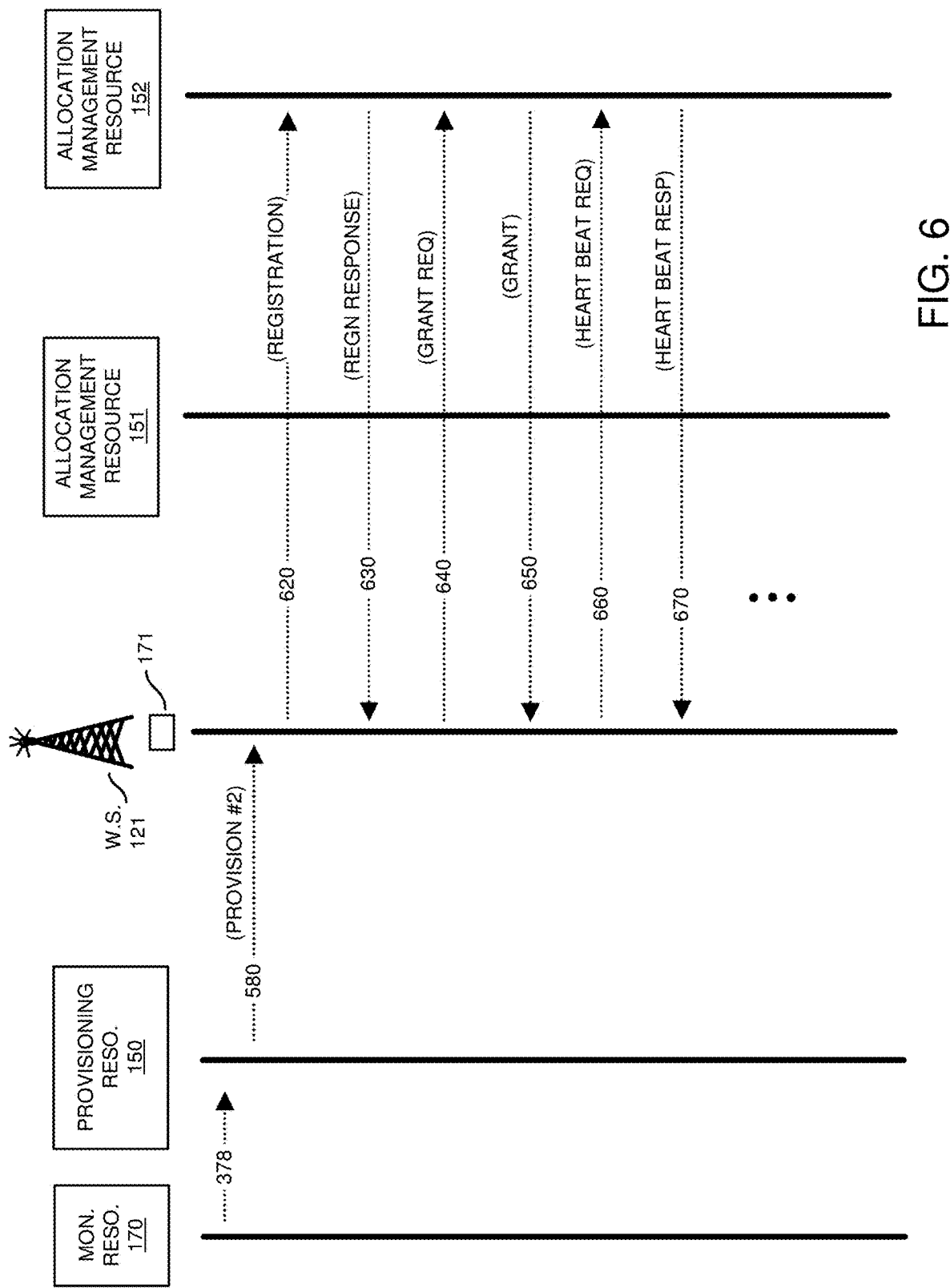

FIGS. 5 and 6 are example timing diagrams illustrating communications facilitating reassignment of a new allocation management resource to a wireless station according to embodiments herein. In this example embodiment, note that the mobile communication devices 101 may experience a wireless service outage when the communication management resource 171 of the wireless station 121 transitions from using the allocation management resource 152 as a replacement to the allocation management resource 151.

More specifically, via communications 178, the monitor resource 170 notifies the provisioning resource 150 that wireless station 121 has been assigned use of allocation management resource 151, which controls use of wireless channels by the wireless station 121.

Via communications 510 (such as message 111), the provisioning resource 150 notifies the communication management resource 171 of wireless station 121 that wireless station 121 has been assigned to the allocation management resource 151. As previously discussed, the communications 510 can include network address information (such as a URL) notifying the wireless station 121 of the network address of allocation management resource 151. Accordingly, the communication management resource 171 of the wireless station 121 communicates with the allocation management resource 151.

Via communications 520, the communication management resource 171 of the wireless station 121 forwards appropriate information to the allocation management resource 151 to register the wireless station 121 with the allocation management resource 151 to receive channel allocation information 131.

Via communications 530, the allocation management resource 151 communicates a registration response to the wireless station 121 indicating that the wireless station 121 has been registered with the allocation management resource 151. In one embodiment, the communications 530 include channel access information 131 indicating one or more wireless channels (and other information) assigned for use by the wireless station 121 to communicate in the network environment 100.

Via communications 540, the communication management resource 171 of the wireless station 121 communicates a grant request (such as a request to use the wireless channel #1) to the allocation management resource 151.

Via communications 550, the allocation management resource 151 communicates a grant permission response, enabling the wireless station 121 to use wireless channel #1. In one embodiment, the communications 550 further include time information such as a heartbeat interval time value indicating rate at which heartbeat communications need to be performed between the communication management resource 171 and the allocation management resource 152 in order for the wireless station 121 to continue use of the wireless channel #1. Communications 550 can further include or specify transmit expire time information (time that grant is valid to use an assigned channel) to the communication management resource 171 of the wireless station 121.

Via communications 560, the communication management resource 171 of the wireless station 121 communicates a heartbeat request (for grant renewal to continue using the wireless channel #1) to the allocation management resource 151.

Via communications 570, the allocation management resource 151 sends a heartbeat response with a grant renewal confirmation indicating that the wireless station 121 can continue to use the wireless channel #1. If the communication management resource 171 of wireless station 121 does not receive a grant renewal confirmation within a threshold amount of time (as indicated by an expiry time value) since the last grant renewal, the communication management resource 171 of the base station 121 must discontinue using the wireless channel #1 to support wireless communications with the communication devices 101.

Via communications 378 from monitor resource 170, the provisioning resource 150 is notified of a trigger condition such as that the wireless station 121 is newly assigned allocation management resource 152. Recall that the reassignment to the allocation management resource 152 can occur for any reason such as because the allocation management resource 151 fails, a business decision has been made to discontinue using the allocation management resource 151, etc.

Via communications 580, the provisioning resource 150 notifies the communication management resource 171 of wireless station 121 that it has been newly assigned to the allocation management resource 152 instead of allocation management resource 151.

In FIG. 6, via communications 620, the communication management resource 171 of wireless station 121 forwards appropriate information to the allocation management resource 152 to register the wireless station 121 with the allocation management resource 152.

Via communications 630, the allocation management resource 152 communicates a registration response to the wireless station 121 indicating that the wireless station 121 has been registered with the allocation management resource 152. In one embodiment, the communications 630 include channel access information 331 (such as the same as or different than channel allocation information 131) indicating one or more wireless channels assigned for use by the wireless station 121 to communicate in the network environment 100.

Via communications 640, the communication management resource 171 of the wireless station 121 communicates a grant request (such as a request to use the wireless channel #1) to the allocation management resource 152.

Via communications 650, the allocation management resource 152 communicates a grant permission response confirming that the wireless station 121 is able to use the wireless channel #1. In one embodiment, the communications further include a heartbeat interval time information (rate at which a heartbeat needs to be performed between the communication management resource 171 and the allocation management resource 152) and transmit expire time information (time that grant is valid to use an assigned channel) to the communication management resource 171 of the wireless station 121.

Via communications 660, the communication management resource 171 of the wireless station 121 communicates a heartbeat request (for grant renewal to continue using the wireless channel #1) to the allocation management resource 151.

Via communications 670, the allocation management resource 151 sends a heartbeat response with a grant renewal indicating that the wireless station 121 is able to continue using the wireless channel #1.

The communication management resource 171 of the wireless station 121 and allocation management resource 152 continue exchange of heartbeat requests and responses so that the wireless station 121 is able to continue to use the wireless channel #1.

Figure 7:
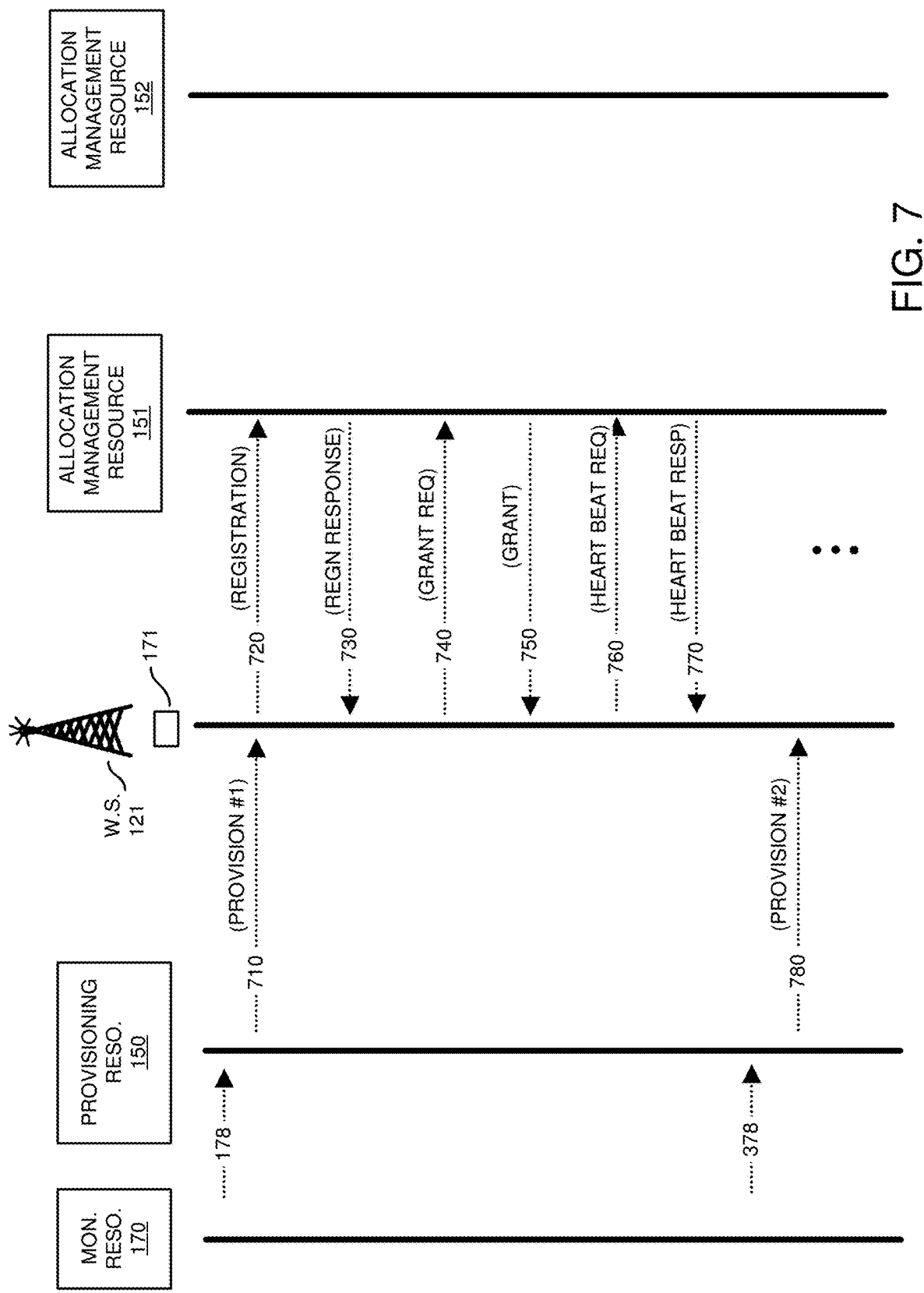
FIGS. 7 and 8 are example timing diagrams illustrating communications according to embodiments herein.
Figure 8:
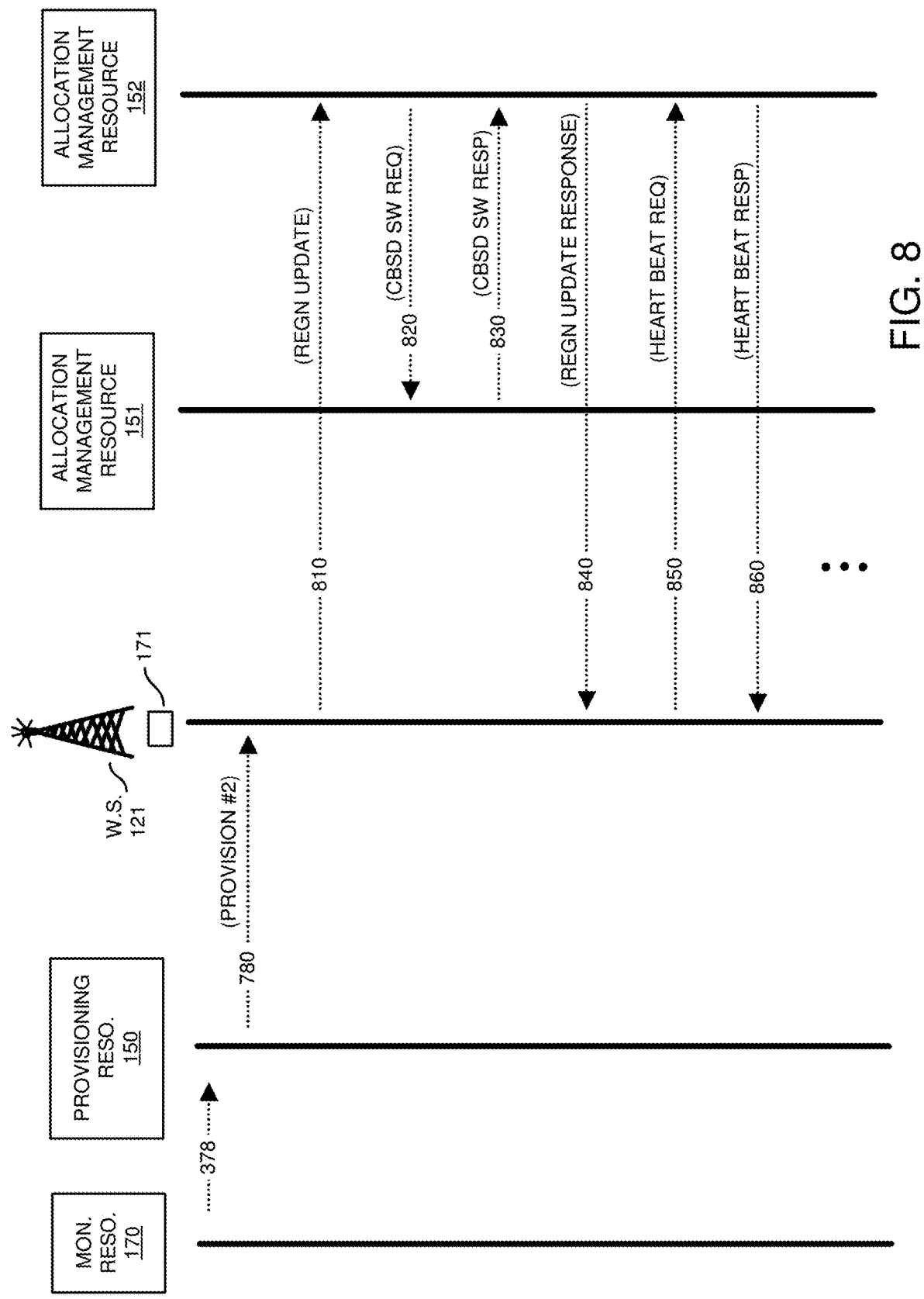

FIGS. 7 and 8 are example timing diagrams illustrating communications facilitating reassignment of an allocation management resource according to a wireless station according to embodiments herein.

Note in this example embodiment that the mobile communication devices 101 do not experience a wireless service outage when the wireless station transitions from using the allocation management resource 152 for grant of the wireless channel #1 as a replacement to the allocation management resource 151 because the switchover occurs before an expiration of grant renewal time needed to continue to use of the allocated wireless channel #1 by the wireless station 121.

As shown, via communications 178, the monitor resource 170 notifies the provisioning resource 150 that wireless station 121 has been assigned to allocation management resource 151, which controls use of wireless channels by the wireless station 121.

Via communications 710 (such as message 111), the provisioning resource 150 notifies the communication management resource 171 of wireless station 121 that wireless station 121 has been assigned to the allocation management resource 151. As previously discussed, the communications 710 can include network address information (such as a URL) notifying the wireless station 121 of the network address of allocation management resource 151. Accordingly, the communication management resource 171 of the wireless station 121 is able to communicate with the allocation management resource 151 to register.

Via communications 720, the wireless station 121 forwards appropriate information to the allocation management resource 151 to register the wireless station 121 with the allocation management resource 151 to receive channel allocation information 131.

Via communications 730, the allocation management resource 151 communicates a registration response to the wireless station 121 indicating that the wireless station 121 has been registered with the allocation management resource 151. In one embodiment, the communications 730 include channel access information 131 indicating one or more wireless channels assigned for use by the wireless station 121 to communicate in the network environment 100.

Via communications 740, the communication management resource 171 of the wireless station 121 communicates a grant request (such as a request to use the wireless channel #1) to the allocation management resource 151.

Via communications 750, the allocation management resource 151 communicates a grant response in which the wireless station 121 is granted use of wireless channel #1. In one embodiment, the communications further include a heartbeat interval time information (rate at which a heartbeat communications need to be performed between the communication management resource 171 and the allocation management resource 152) and transmit expire time information (time that grant is valid to use an assigned channel) to the communication management resource 171 of the wireless station 121.

Via communications 760, the communication management resource 171 of the wireless station 121 communicates a heartbeat request (for a grant renewal or permission to continue using the wireless channel #1) to the allocation management resource 151.

Via communications 770, the allocation management resource 151 sends a heartbeat response with a grant renewal. Note that if the communication management resource 171 of wireless station 121 does not receive a grant permission renewal within an expiry time (threshold amount of time such as specified by the channel allocation information) of a last grant renewal, the communication management resource 171 of the base station 121 discontinues using the wireless channel #1 to support wireless communications with the communication devices 101. As further discussed below, in this example embodiment, the communication management resource 171 performs a registration update (as discussed below via communications 810 through 840) with allocation management resource 152 prior to a time expiration of a prior grant permission by the allocation management resource 151 to use the wireless channel #1.

Via communications 378 from monitor resource 170, the provisioning resource 150 is notified that the wireless station 121 is newly assigned allocation management resource 152.

Via communications 780, the provisioning resource 150 notifies the communication management resource 171 of wireless station 121 that it has been newly assigned to the allocation management resource 152 instead of allocation management resource 151. Communications 780 can indicate an address or URL of the allocation management resource 152.

In FIG. 8, via communications 810, the communication management resource 171 of wireless station 121 or other suitable resource forwards appropriate information (such as a registration update request) to the allocation management resource 152 to register the wireless station 121 with the allocation management resource 152 to receive channel allocation information 331. This notifies the allocation management resource 152 that the wireless station 121 is attempting to continue use of a prior assigned wireless channel #1.

Via communications 820, the allocation management resource 150 notifies the allocation management resource 151 of the switchover request by the wireless station 121

Via communications 830, the allocation management resource 151 communicates a switch response to the allocation management resource 152. In one embodiment, via communications 830, the allocation management resource 151 provides notification of the channel access information 131 currently used by the wireless station 121 to provide wireless services to communication devices 101.

Via communications 840, the allocation management resource 152 communicates a registration update response to the communication management resource 171 of the wireless station 121. This notifies the wireless station 121 that the wireless station 121 is registered with the allocation management resource 152 and that the wireless station 121 can potentially continue use of the prior assigned wireless channel #1.

Via communications 850, the communication management resource 171 of the wireless station 121 communicates a heartbeat request (for grant renewal to continue using the wireless channel #1) to the allocation management resource 151.

Via communications 860, the allocation management resource 151 sends a heartbeat response with a grant renewal confirmation. This notifies the communication management resource 171 that the wireless station 121 is able to continue to use the wireless channel #1.

The communication management resource 171 of the wireless station 121 and allocation management resource 152 continue exchange of heartbeat requests and responses so that the wireless station 121 is able to continue to use the wireless channel #1.

In accordance with further embodiments, the time difference between receiving communications 770 (last heartbeat response resetting an expiry timer and grant of using wireless channel #1) and received communications 840 or received communications 860 (next grant of using wireless channel #1 again) at the communication management resource 171 is less than a predetermined threshold value.

For example, it may be required that the communication management resource 171 of wireless station 121 receive an acknowledge/confirmation within a threshold amount of time that the wireless channel #1 is still assigned for use by the wireless station 121 to support communications with the mobile communication device 101. In other words, the time difference between receiving grant in communications 770 and grant in communications 860 must be less than a threshold value or the wireless station 121 must discontinue using the wireless channel #1.

In one embodiment, the combination of communications (such as communications 810, 820, 830, and 840) provide an expedient way (such as amount of time less than a threshold value) of re-registering with a new allocation management resource and providing grant renewal confirmations of using prior assigned wireless channel #1 such that the wireless station 121 is able to provide non-stop (continuous) use of the wireless channel #1 during switchover from allocation management resource 151 to allocation management resource 152. In other words, mobile communication devices 101 do not experience a loss of wireless service during a transition of the wireless station 121 switching from the allocation management resource 151 to the allocation management resource 152 as long as successive grant of using wireless channel #1 are less than threshold value.

Figure 9:
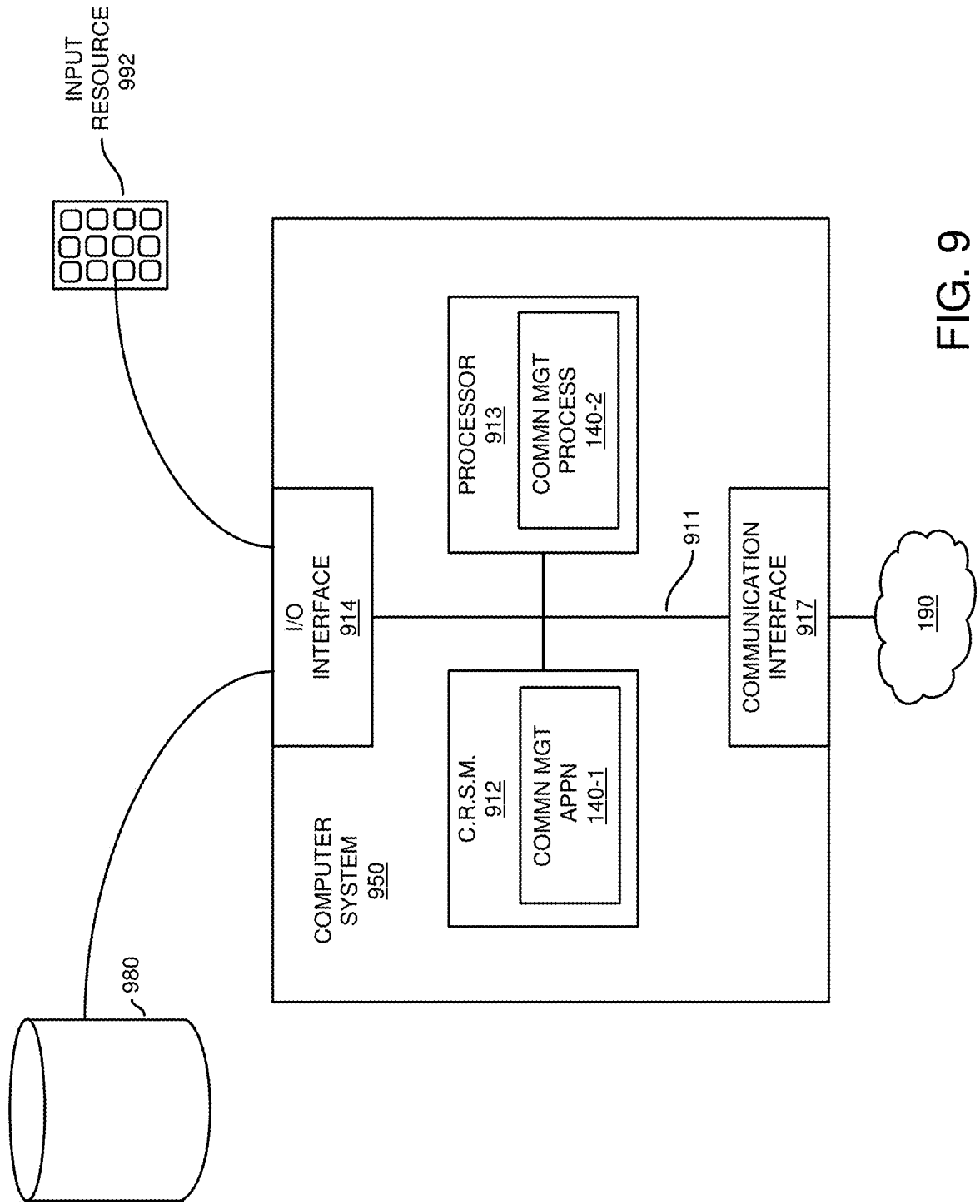
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as provisioning resource 150, control resource 173, monitor resource 170, allocation management resource 151, allocation management resource 152, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 10-11. Note that the steps in the flowcharts below can be executed in any suitable order.

Figure 10:
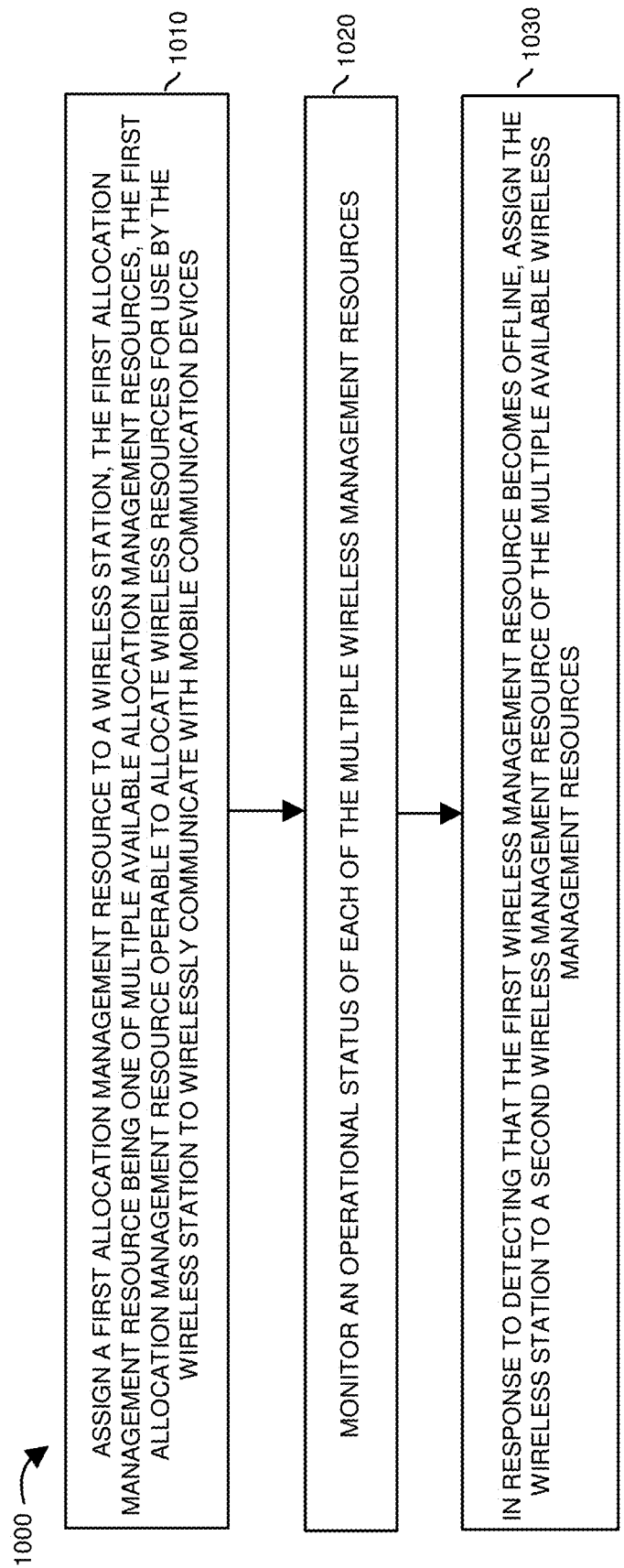
FIGS. 10-11 are example diagrams illustrating methods according to embodiments herein.

FIG. 10 is a flowchart 1000 illustrating an example method according to embodiments. Note that there will be some overlap with respect to concepts as discussed above.

In processing operation 1010, the control resource 173 assigns allocation management resource 151 to provide channel allocation information to the wireless station 121. The allocation management resource 151 is one of multiple available allocation management resources available to provide channel allocation information to wireless station 121, 122, etc. Based on the assignment, the first allocation management resource 171 is operable to allocate wireless resources for use by the wireless station 121 to wirelessly communicate with mobile communication devices 101.

In processing operation 1020, the control resource 173 monitors an operational status of each of the multiple wireless management resources 151, 152, etc.

In processing operation 1030, in response to detecting that the first wireless management resource 151 becomes offline, the control resource 173 assigns the wireless station 121 to allocation management resource 152.

Figure 11:
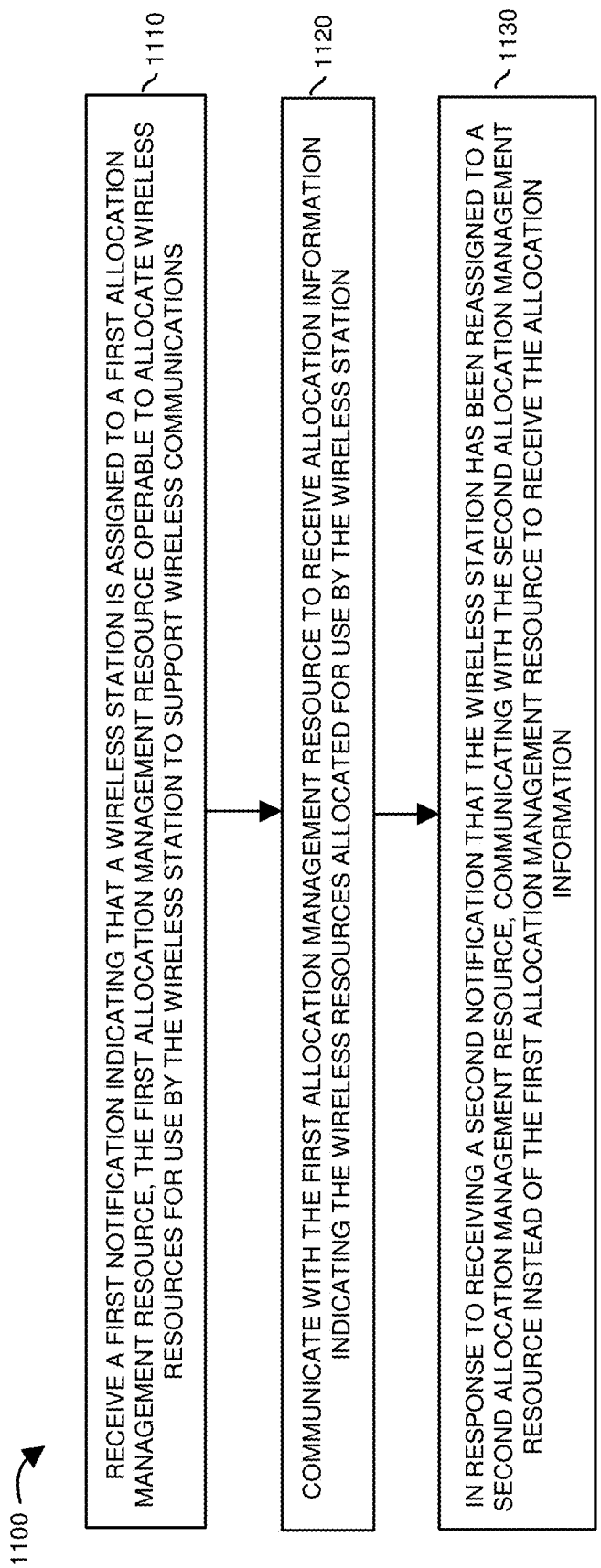

FIG. 11 is a flowchart 1100 illustrating an example method according to embodiments. Note that there will be some overlap with respect to concepts as discussed above.

In processing operation 1110, the wireless station 121 receives a first notification (such as message 111) indicating that wireless station 121 is assigned to a first allocation management resource 151. In this example embodiment, the allocation management resource 151 allocates wireless resources for use by the wireless station 121 to support wireless communications with communication devices 101.

In processing operation 1120, the wireless station 121 communicates with the first allocation management resource 151 to receive channel allocation information 131 indicating the wireless resources allocated for use by the wireless station 121.

In processing operation 1130, in response to receiving a second notification (such as message 311) indicating that the wireless station 121 has been reassigned to a second allocation management resource 152, the wireless station 121 communicates with the second allocation management resource 152 to register the wireless station 121 with the allocation management resource 152 to be granted use of wireless resources.

Figure 12:
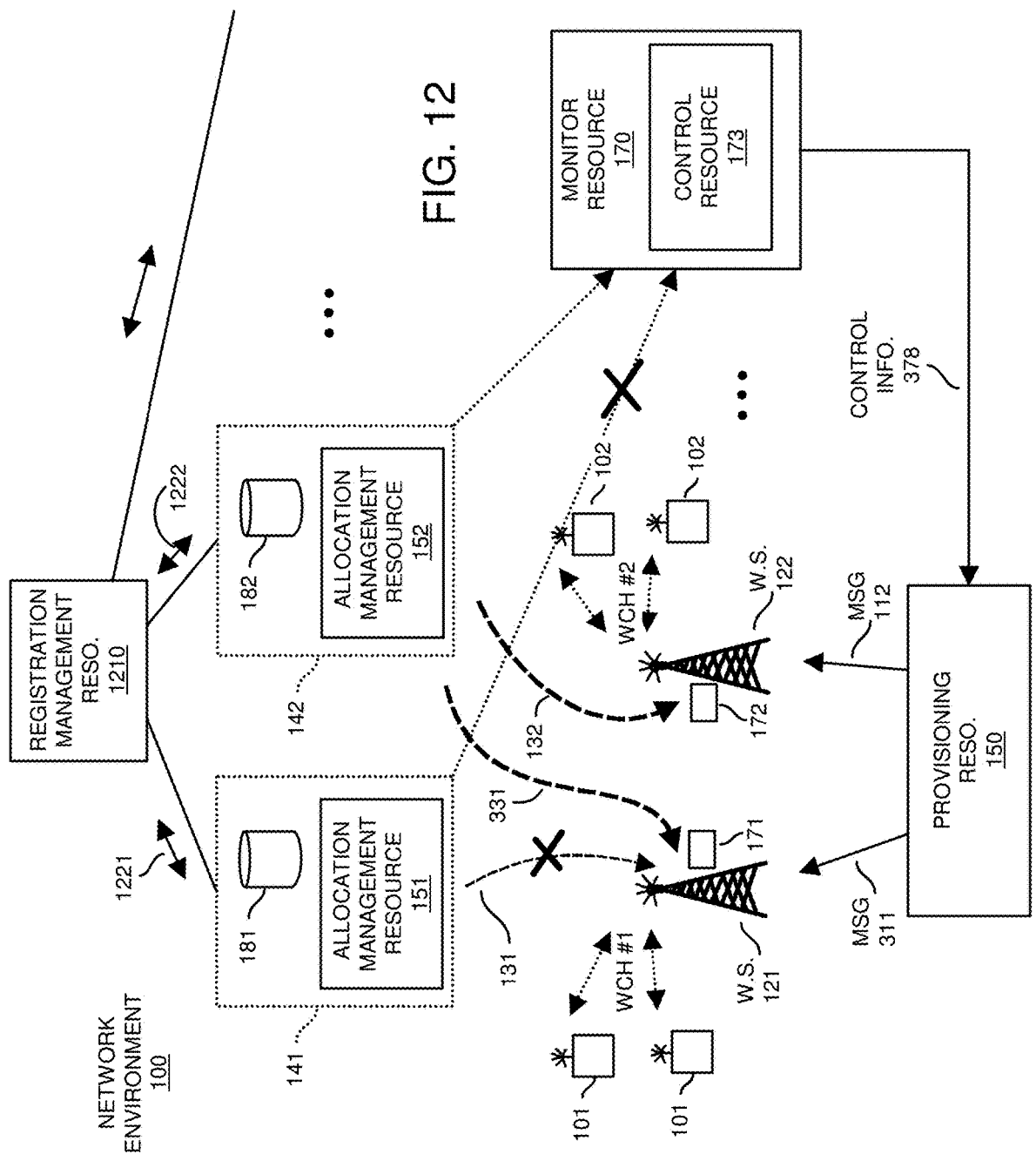
FIG. 12 is an example diagram illustrating a wireless network environment and implementation of a registration management resource according to embodiments herein

FIG. 12 is an example diagram illustrating a wireless network environment and implementation of a (central) registration management resource according to embodiments herein.

In this example embodiment, in a similar manner as previously discussed, each of the allocation management resources 151, 152, etc., notifies the registration management resource 1210 of currently assigned wireless resources to respective wireless stations.

For example, as previously discussed, the allocation management resource 151 produces channel allocation information 131 (for wireless station 121) indicating wireless resources allocated for use by the wireless station 121 to provide wireless connectivity to user equipment such as mobile communication devices 101; the allocation management resource 152 provides channel allocation information 132 indicating wireless resources allocated for use by the wireless station 122 to provide wireless connectivity to user equipment such as mobile communication devices 102; etc.

Prior to detecting a trigger event causing switchover of assigning the wireless station 121 a new allocation management resource, each of the allocation management resources communicate allocation information associated with or assigned to the wireless stations to the registration management resource 1210. In one embodiment, the registration management resource 1210 acts as a central repository in which to store copies of allocation information currently assigned to the different wireless stations.

More specifically, via communications 1221, the allocation management resource 151 notifies the registration management resource 1210 of the channel allocation information 131 assigned to the wireless station 121; via communications 1222, the allocation management resource 152 notifies the registration management resource 1210 of the channel allocation information 132 assigned to the wireless station 122; and so on. Thus, registration management resource 1210 keeps track of the currently assigned usage of available wireless spectrum (e.g., wireless channels).

As further discussed below, the registration management resource 1210 makes the stored allocation information for each of the wireless stations available to any resource in the network environment 100. For example, in one embodiment, in response to detecting a condition such as failure of the allocation management resource 151, the registration management resource can be configured to make the channel allocation information 131 available to any resource such as allocation management resource 152, wireless stations, provisioning resource 150. etc. Thus, if the new allocation management resource 152 can retrieve the channel allocation information 131 from the allocation management resource 151, the allocation management resource 152 can communicate with the registration management resource 1210 to receive notification of wireless channels currently assigned to the different wireless stations. This is more particularly discussed below.

Figure 13:
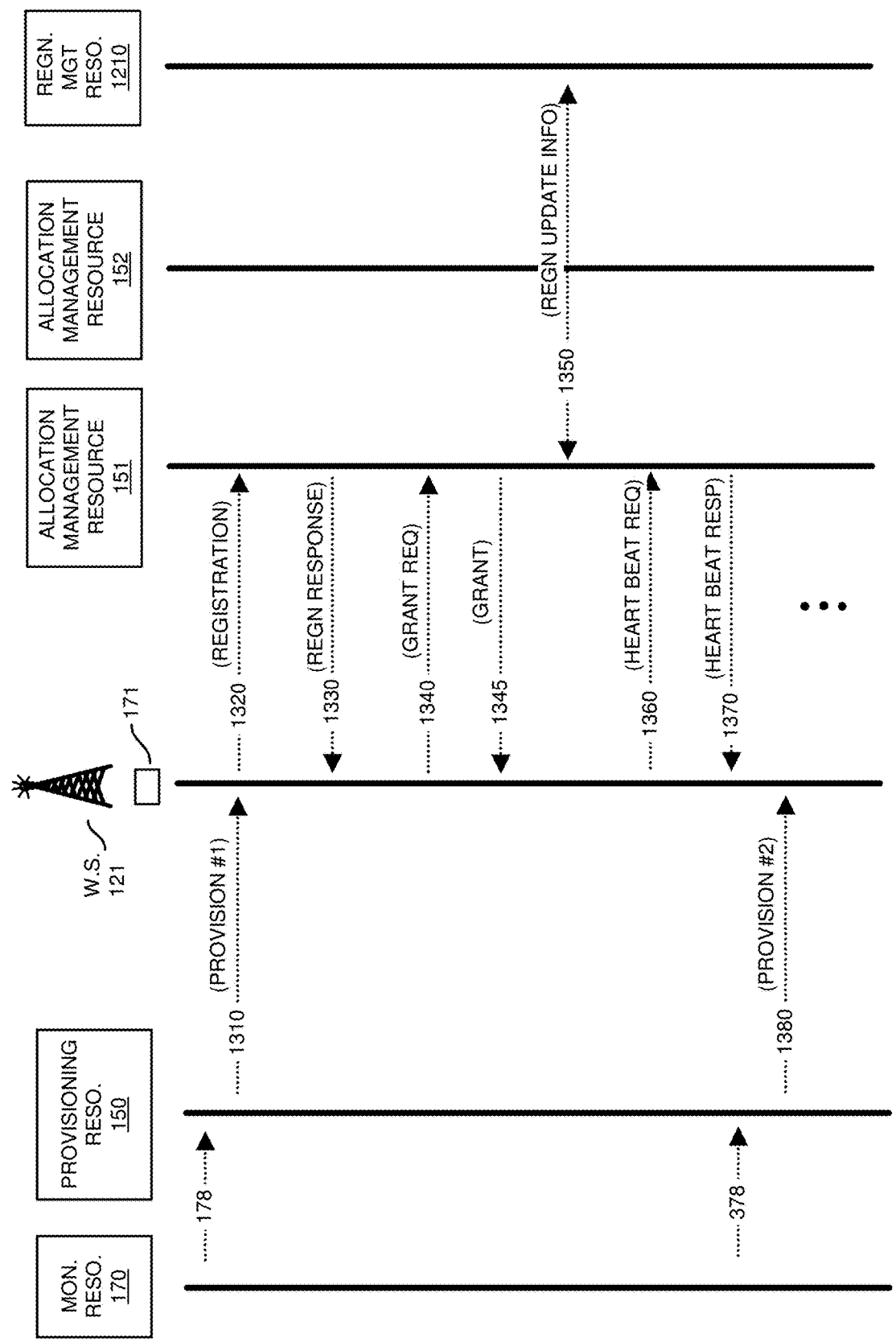
FIGS. 13 and 14 are example timing diagrams illustrating communications supporting switchover according to embodiments herein.
Figure 14:
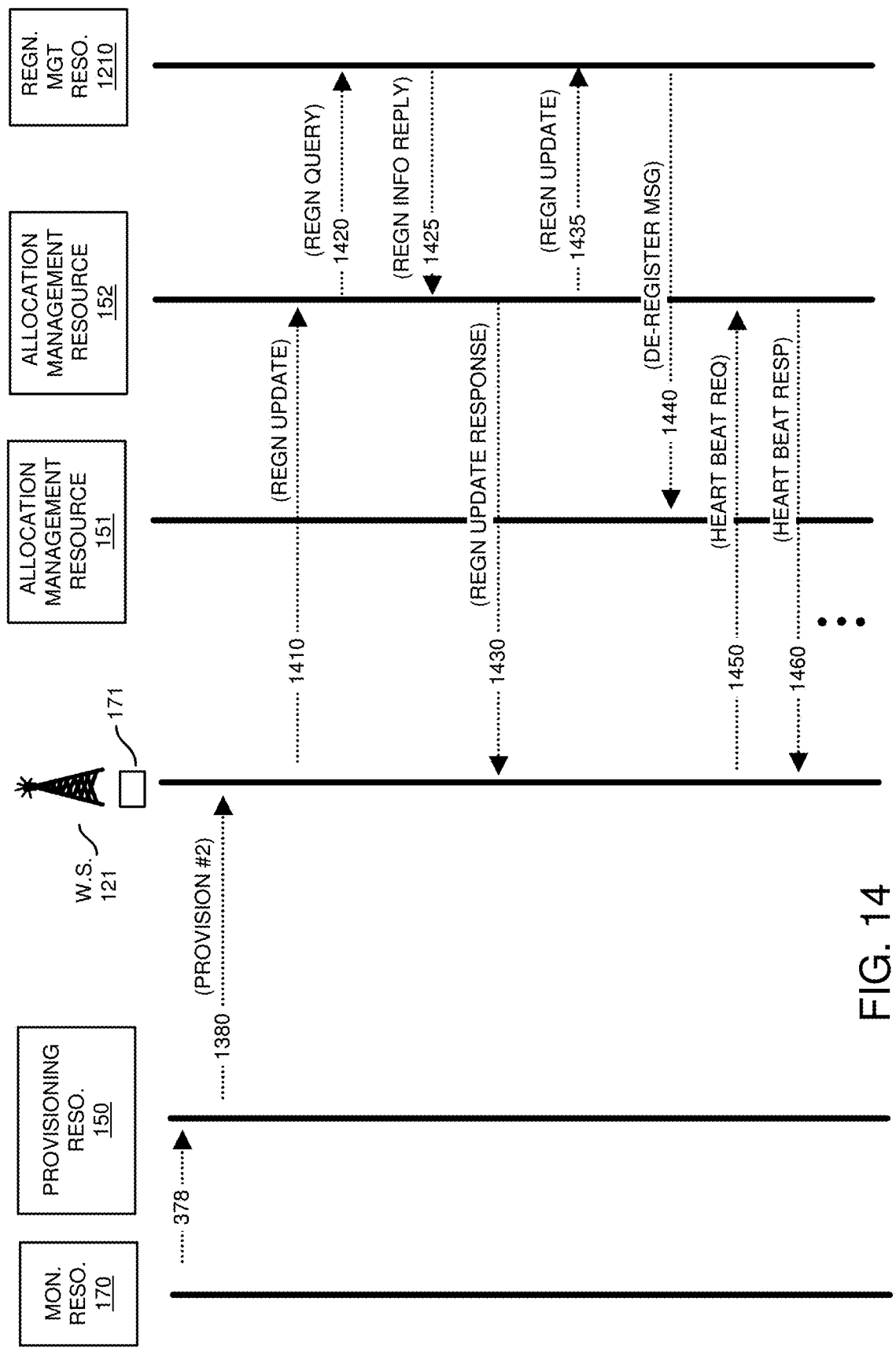

FIGS. 13 and 14 are example timing diagrams illustrating communications facilitating assignment of a new allocation management resource to a wireless station according to embodiments herein.

Note in this example embodiment that the mobile communication devices 101 do not experience a wireless service outage when the wireless station transitions from using the allocation management resource 152 for grant of the wireless channel #1 as a replacement to the allocation management resource 151 because the switchover occurs before an expiration of grant renewal time needed to continue to use of the allocated wireless channel #1. In other words, the wireless station 121 continues to use the same channel allocation information 131 (assigned before the switchover) to provide mobile communication devices 101 wireless connectivity to a remote network even though the wireless station 121 is assigned new allocation management resource 152 as a replacement to the allocation management resource 151.

More specifically, as shown, via communications 178, assume that the monitor resource 170 notifies the provisioning resource 150 that wireless station 121 has been initially assigned to allocation management resource 151.

Via communications 1310 (such as message 111), the provisioning resource 150 notifies the communication management resource 171 of wireless station 121 that wireless station 121 has been assigned to the allocation management resource 151. As previously discussed, the communications 1310 can include network address information (such as a URL) notifying the wireless station 121 of the network address of allocation management resource 151. Accordingly, the communication management resource 171 of the wireless station 121 is able to communicate with the allocation management resource 151 to register.

Via further communications 1320, the wireless station 121 forwards appropriate registration information to the allocation management resource 151 to register the wireless station 121 with the allocation management resource 151 to receive channel allocation information 131.

Via communications 1330, the allocation management resource 151 communicates a registration response to the wireless station 121 indicating that the wireless station 121 has been registered with the allocation management resource 151. Such a registration indicates that allocation management resource 151 controls use of wireless resources in the network environment 100. In one embodiment, the communications 1330 include channel access information 131 indicating one or more wireless channels, corresponding power transmit levels, etc., assigned for use by the wireless station 121 to communicate in the network environment 100.

Via communications 1340, the communication management resource 171 of the wireless station 121 communicates a grant request (such as a request to use the wireless channel #1) to the allocation management resource 151.

Via communications 1345, the allocation management resource 151 communicates a grant response for using wireless channel #1. In one embodiment, the communications 1350 further include information such as heartbeat interval time information (rate at which a heartbeat needs to be performed between the communication management resource 171 and the allocation management resource 152) and transmit expire time information (time that grant is valid to use an assigned channel) to the communication management resource 171 of the wireless station 121.

Via communications 1350 (or communications 1221 in FIG. 12), the allocation management resource 151 notifies registration management resource 1210 of the channel allocation information 131 assigned for use by the wireless station 121. In this way, the registration management resource 1210 keeps track of the channel allocation information 131 assigned to the wireless station 121 (and other wireless stations).

Via communications 1360, the communication management resource 171 of the wireless station 121 communicates a heartbeat request (for a grant renewal or permission to continue using any assigned wireless resources such as the wireless channel #1) to the allocation management resource 151.

Via communications 1370, the allocation management resource 151 sends a heartbeat response with a grant renewal notification. Note that if the communication management resource 171 of wireless station 121 does not receive a grant permission renewal within an expiry time (threshold amount of time such as indicated by assigned channel allocation information 131) of a last grant renewal, the communication management resource 171 of the base station 121 must discontinue using the wireless channel #1 to support wireless communications with the communication devices 101.

Via communications 378 from monitor resource 170, the provisioning resource 150 is notified that the wireless station 121 is newly assigned allocation management resource 152.

Via communications 1380, the provisioning resource 150 notifies the communication management resource 171 of wireless station 121 that it has been newly assigned to the allocation management resource 152 instead of allocation management resource 151.

In FIG. 14, via communications 1410, in response to receiving the new assignment (or request for new assignment) to allocation management resource 152, the communication management resource 171 of wireless station 121 forwards appropriate information (such as a registration update request) to the allocation management resource 152 to register the wireless station 121 with the allocation management resource 152 to continue to use channel allocation information 131 or potentially receive new channel allocation information.

In one embodiment, the communications 1410 from wireless station 121 to allocation management resource 152 include or indicate previously assigned channel allocation information 131 assigned by the allocation management resource 151 to the wireless station 121. Accordingly, embodiments herein include communicating the allocation information 131 from the wireless station 121 to the second allocation management resource 152. In one embodiment, the communications 1410 notify the allocation management resource 152 that the wireless station 121 is attempting to continue use of a prior assigned wireless channel #1 and corresponding channel allocation information 131.

Via communications 1420, the allocation management resource 152 communicates a registration query to the registration management resource 1210. The registration query notifies the allocation management resource 151 of the switchover request associated with the wireless station 121. In one embodiment, the communications 1420 include a register request message requesting wireless station registration and/or grant information.

Via communications 1425, the registration management resource 1210 communicates a switchover response (registration information reply) to the allocation management resource 152. In one embodiment, the communications 1425 include notification of the channel access information 131 (channel allocation, power information, etc., as indicated by the channel allocation information 131) previously assigned and currently used by the wireless station 121 to provide wireless services to communication devices 101. In one embodiment, via communications 1425, the registration management resource 1210 verifies use of the wireless resources, as specified by the allocation information 131, to the second allocation management resource 152.

Via communications 1430, the allocation management resource 152 communicates a registration update response to the wireless station 121. In one embodiment, the communications 1430 include notification that the wireless station 121 has been registered with the allocation management resource 152. In accordance with further embodiments, the communications 1430 indicate that the wireless station 121 is able to continue using the channel allocation information 131 to provide wireless connectivity to mobile communication devices 101. Accordingly, embodiments herein include receiving confirmation (such as via communications 1430) from the second allocation management resource 152 that the allocation information 131 is valid for use by the wireless station 121.

Via communications 1435, the allocation management resource 152 communicates a registration update message to the registration management resource 1210. In one embodiment, the communications 1435 notify the wireless station 121 that the wireless station 121 is registered with the allocation management resource 152 and that the wireless station 121 can potentially continue use of the prior assigned wireless channel #1. The communications 1435 can indicate that the wireless station 121 is still assigned use of channel allocation information 131 (wireless channel #1).

Via communications 1440, the registration management resource 1210 communicates an un-register or deregister message to the allocation management resource 151. This notifies the allocation management resource 151 that the allocation management resource 151 is no longer assigned to communicate channel allocation information to the wireless station 121. As previously discussed, the allocation management resource 151 may be disabled.

Via communications 1450, the communication management resource 171 of the wireless station 121 communicates a heartbeat request (request for grant renewal to continue using the wireless channel #1 and corresponding assigned channel allocation information 131) to the allocation management resource 152.

Via communications 1460, the allocation management resource 152 sends a heartbeat response with a grant renewal confirmation. This notifies the communication management resource 171 that the wireless station 121 is able to continue using the wireless channel #1 and corresponding prior assigned channel allocation information 131.

In a manner as previously discussed, the communication management resource 171 of the wireless station 121 and allocation management resource 152 continue exchange of heartbeat requests and responses so that the wireless station 121 is able to continue to use the wireless channel #1 to provide communication devices 101 connectivity in a manner as previously discussed.

In accordance with further embodiments, the time difference between receiving communications 1370 (such as a last heartbeat response including a grant and resetting of an expiry timer) and received communications 1450 or received communications 1460 at the communication management resource 171 is less than a predetermined threshold value (such as timeout value). For example, as previously discussed, it may be required that the communication management resource 171 of wireless station 121 receive an acknowledge/confirmation within a threshold amount of time of a last grant that the wireless channel #1 and corresponding channel allocation information 131 is still assigned for use by the wireless station 121 to support communications with the mobile communication devices 101.

In one embodiment, the combination of communications (such as one or more communications 1410, 1420, 1430, and 1440) provide an expedient way of re-registering with a new (healthy or operational) allocation management resource (such as allocation management resource 152) and providing grant renewal confirmations of using prior assigned wireless channel #1 such that the wireless station 121 is able to provide non-stop (continuous) use of the wireless channel #1 and corresponding channel allocation information 131 during switchover from allocation management resource 151 to allocation management resource 152. In other words, mobile communication devices 101 do not experience a loss of wireless service during a transition of the wireless station 121 switching from the allocation management resource 151 to the allocation management resource 152.

Figure 15:
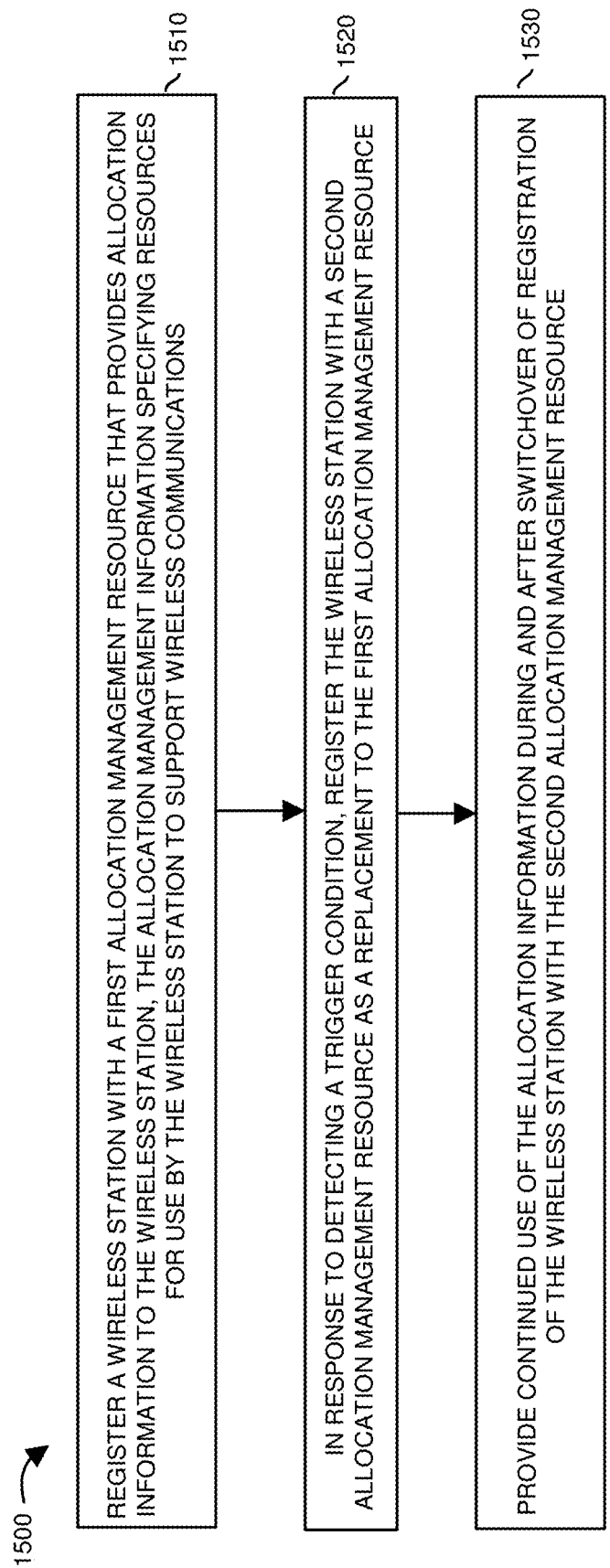
FIG. 15 is an example diagram illustrating method according to embodiments herein.

FIG. 15 is an example diagram illustrating method according to embodiments herein.

In processing operation 1510, the system registers wireless station 121 with a first allocation management resource 151 that provides allocation information 131 to the wireless station 121. As previously discussed, the allocation information 131 specifies wireless resources for use by the wireless station 121 to support wireless communications with respective mobile communication devices 101.

In processing operation 1520, in response to detecting a trigger condition, the system registers the wireless station 121 with allocation management resource 152 as a replacement to the first allocation management resource 151.

In processing operation 1530, the system provides continued use of the allocation information 131 (such as wireless channel #1) during and after switchover of registration of the wireless station 121 with the second allocation management resource 152.

Note again that techniques herein are well suited to facilitate dynamic allocation of channel allocation information from one or more allocation management resources depending on operating conditions. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   receiving a first notification indicating that a wireless base station is assigned to a first allocation management resource, the first allocation management resource operable to allocate wireless resources for use by the wireless base station to support wireless communications with a mobile communication device;
   communicating with the first allocation management resource to receive allocation information indicating the wireless resources allocated for use by the wireless base station;
   in response to receiving a second notification that the wireless base station has been reassigned to a second allocation management resource, communicating with the second allocation management resource instead of the first allocation management resource, the second allocation management resource granting the wireless base station permission to use the wireless resources allocated by the first allocation management resource; and
   wherein the first allocation management resource and the second allocation management resource are disparately located with respect to the wireless base station.

2. The method as in claim 1, wherein communicating with the second allocation management resource includes:
   registering the wireless base station with the second allocation management resource to receive the permission to use the wireless resources.

3. The method as in claim 2 further comprising:
   receiving a registration response from the second allocation management resource, the registration response indicating registration of the wireless base station with the second allocation management resource to receive the permission.

4. The method as in claim 1, wherein the allocation information indicates wireless bandwidth of a CBRS (Citizen Band Radio Service) band allocated for use by the wireless base station.

5. The method as in claim 1, wherein the allocation information indicates a wireless channel allocated for use by the wireless base station.

6. The method as in claim 1, wherein communicating with the second allocation management resource includes:
   transmitting a message to the second allocation management resource in response to receiving the second notification, the message indicating a wireless bandwidth allocated to the wireless base station by the first allocation management resource.

7. The method as in claim 6 further comprising:
   receiving an acknowledgement message from the second allocation management resource indicating that the wireless base station is registered with the second allocation management resource.

8. The method as in claim 1, wherein the first allocation management resource is operable to communicate a switchover command to the second allocation management resource in response to receiving the second notification.

9. The method as in claim 1 further comprising:
communicating a message to the second allocation management resource, the message indicating wireless bandwidth allocated to the wireless base station by the first allocation management resource.

10. The method as in claim 1 further comprising:
at the wireless base station:
utilizing a wireless channel as indicated by the allocation information to wirelessly communicate with the mobile communication device; and
providing continued wireless connectivity between the wireless base station and the mobile communication device during switchover from being assigned the first allocation management resource to being assigned the second allocation management resource.

11. The method as in claim 1, wherein the second notification is generated in response to detecting an inability of the first allocation management resource to grant the permission.

12. A system comprising:
provisioning hardware; and
a wireless base station to:
receive a first notification from the provisioning hardware, the first notification indicating that the wireless base station is assigned to a first allocation management resource, the first allocation management resource operable to allocate wireless resources for use by the wireless base station to support wireless communications with a mobile communication device;
communicate with the first allocation management resource to receive allocation information indicating the wireless resources allocated for use by the wireless base station;
in response to receiving a second notification that the wireless base station has been reassigned to a second allocation management resource, communicate with the second allocation management resource instead of the first allocation management resource to be granted permission to use the wireless resources;
receive a grant of permission from the second allocation management resource to use the wireless resources allocated by the first allocation management resource to the wireless base station; and
wherein the first allocation management resource and the second allocation management resource are disparately located with respect to the wireless base station.

13. The system as in claim 12, wherein the wireless base station is further operable to register the wireless base station with the second allocation management resource to receive the permission.

14. The system as in claim 13, wherein the wireless base station is further operable to:
receive a registration response from the second allocation management resource, the registration response indicating registration of the wireless base station with the second allocation management resource.

15. The system as in claim 12, wherein the allocation information indicates wireless bandwidth of a CBRS (Citizen Band Radio Service) band allocated for use by the wireless base station.

16. The system as in claim 12, wherein the allocation information indicates a wireless channel allocated for use by the wireless base station.

17. The system as in claim 12, wherein the wireless base station is further operable to:
transmit a message to the second allocation management resource in response to receiving the second notification, the message including a registration request indicating to register the wireless base station with the second allocation management resource.

18. The system as in claim 17, wherein the wireless base station is further operable to:
receive an acknowledgement message from the second allocation management resource indicating that the wireless base station is registered with the second allocation management resource to receive the permission.

19. The system as in claim 12, wherein the second allocation management resource is operable to communicate a switchover command from the first allocation management resource to the second allocation management resource in response to receiving a switchover request from the wireless base station.

20. The system as in claim 12, wherein the first allocation management resource is further operable to:
communicate a message to the second allocation management resource, the message indicating wireless bandwidth allocated for use by the first allocation management resource to the wireless base station.

21. The system as in claim 12, wherein the wireless base station is further operable to:
utilize a wireless channel as indicated by the allocation information to wirelessly communicate with the mobile communication device; and
provide continued wireless connectivity between the wireless base station and the mobile communication device during switchover from being assigned the first allocation management resource to being assigned the second allocation management resource.

22. The system as in claim 12, wherein the second notification is generated in response to detecting an inability of the first allocation management resource to provide the allocation information to the wireless base station.

23. Computer-readable storage hardware having instructions stored thereon, the instructions, when carried out by computer processor hardware, cause the computer processor hardware to:
receive a first notification indicating that a wireless base station is assigned to a first allocation management resource, the first allocation management resource operable to allocate wireless resources for use by the wireless base station to support wireless communications with a mobile communication device;
communicate with the first allocation management resource to receive allocation information indicating the wireless resources allocated for use by the wireless base station;
in response to receiving a second notification that the wireless base station has been reassigned to a second allocation management resource, communicate with the second allocation management resource instead of the first allocation management resource to be granted permission to use the wireless resources; and
receive a grant of permission from the second allocation management resource to use the wireless resources allocated by the first allocation management resource to the wireless base station, the first allocation management resource and the second allocation management resource being disparately located with respect to the wireless base station.

24. The method as in claim 1, wherein communicating with the first allocation management resource includes:
   transmitting a request for allocation of the wireless resources over a communication link from the wireless base station to the first allocation management resource; and
   in response to transmitting the request, receiving a response over the communication link from the first allocation management resource, the response including notification of the wireless resources allocated for use by the wireless base station.

25. The method as in claim 1, wherein receiving the first notification indicating that the wireless base station is assigned to the first allocation management resource includes receiving the first notification from a communication management resource that monitors a status of the first allocation management resource; and
   wherein receiving the second notification indicating that the wireless base station has been reassigned to the second allocation management resource includes receiving the second notification from the communication management resource that monitors a status of the second allocation management resource.

26. The method as in claim 25, wherein the communication management resource is operative to reassign the wireless base station to the second allocation management resource in response to detecting a failure condition associated with the first allocation management resource.

27. The method as in claim 1, wherein communicating with the second allocation management resource includes:
   transmitting communications from the wireless base station to the second allocation management resource in response to receiving the second notification; and
   in response to transmitting communications to the second allocation management resource, receiving an acknowledgement message from the second allocation management resource indicating that the wireless base station is registered with the second allocation management resource.

28. The method as in claim 1, wherein the first allocation management resource and the second allocation management resource are in communication with a registration management resource, the registration management resource operative to track usage of the wireless resources allocated for use by the wireless base station.

29. The method as in claim 1 further comprising:
   in response to receiving the first notification, registering the wireless base station with the first allocation management resource; and
   in response to receiving the second notification, registering the wireless base station with the second allocation management resource.

30. The method as in claim 1, wherein the allocation information indicates a first wireless channel allocated to the wireless base station.

31. The method as in claim 30, wherein the allocation information is first allocation information, the first allocation information received from the first allocation management resource; and
   wherein communicating with the second allocation management resource includes: receiving second allocation information, the second allocation information indicating allocation of the first wireless channel to the wireless base station.

32. The method as in claim 1, wherein communicating with the first allocation management resource includes:
   registering the wireless base station with the first allocation management resource; and
   receiving the allocation information from the first allocation management resource subsequent to the registering.

33. The method as in claim 1, wherein the first allocation management resource controls wireless channel use by the wireless base station prior to receiving the second notification; and
   wherein the second allocation management resource controls wireless channel use by the wireless base station after receiving the second notification.

\* \* \* \* \*